(12) United States Patent
Akimoto et al.

(10) Patent No.: US 8,463,523 B2
(45) Date of Patent: Jun. 11, 2013

(54) CONTROL DEVICE OF INVERTED PENDULUM TYPE VEHICLE

(75) Inventors: Kazushi Akimoto, Saitama (JP); Hideo Murakami, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/394,449

(22) PCT Filed: Sep. 18, 2009

(86) PCT No.: PCT/JP2009/004729
§ 371 (c)(1),
(2), (4) Date: Mar. 6, 2012

(87) PCT Pub. No.: WO2011/033579
PCT Pub. Date: Mar. 24, 2011

(65) Prior Publication Data
US 2012/0166056 A1    Jun. 28, 2012

(51) Int. Cl.
*G01P 15/14* (2006.01)
(52) U.S. Cl.
USPC .................. 701/93; 701/82; 73/514.36
(58) Field of Classification Search
USPC .................. 701/82, 93; 73/514.36
See application file for complete search history.

(56) References Cited

U.S. PATENT DOCUMENTS

| 8,014,923 B2 | 9/2011 | Ishii et al. |
| 2009/0107240 A1* | 4/2009 | Senba et al. ............... 73/514.36 |

FOREIGN PATENT DOCUMENTS

| JP | 4-201793 A | 7/1992 |
| JP | 2008-120347 A | 5/2008 |
| WO | 2008/081815 A1 | 7/2008 |
| WO | 2008/132778 A1 | 11/2008 |
| WO | 2008/132779 A1 | 11/2008 |
| WO | 2008/139740 A1 | 11/2008 |

* cited by examiner

*Primary Examiner* — Mary Cheung
*Assistant Examiner* — Yuen Wong
(74) *Attorney, Agent, or Firm* — Carrier Blackman & Associates, P.C.; Joseph P. Carrier; William D. Blackman

(57) ABSTRACT

An inverted pendulum type vehicle includes a loaded mode in which an object to be transported is loaded on a boarding unit, and a non-loaded state mode in which the object to be transported is not loaded thereon. When traveling velocities of a representative point of the vehicle in a steady-state, in which tilt errors $\theta be\_x\_s$, $\theta be\_y\_s$ between actual tilt angles of a boarding unit and desired tilt angles thereof are maintained, constant are $Vb\_x\_stb$, $Vb\_y\_stb$, a traveling motion of a traveling motion unit is controlled such that at least a ratio of a magnitude of $Vb\_x\_stb$ with respect to a magnitude of $\theta be\_x\_s$ becomes a smaller ratio in the non-loaded state mode than in the loaded state mode. Such inverted pendulum type vehicle is difficult to move in the non-loaded state mode, and is easy to move in the loaded mode.

7 Claims, 12 Drawing Sheets

CONTROL DEVICE OF INVERTED PENDULUM TYPE VEHICLE

TECHNICAL FIELD

The present invention relates to a control device of an inverted pendulum type vehicle capable of moving on a floor surface.

BACKGROUND ART

Conventionally, there is known an inverted pendulum type vehicle, in which a base body assembled with a traveling motion unit which travels on a floor surface and an actuator unit which drives the traveling motion unit, is also assembled with a payload supporting part of an occupant which is capable of freely tilting with respect to the perpendicular direction. The inverted pendulum type vehicle is a vehicle with a necessity to move the traveling motion unit in a manner to move a fulcrum of the inverted pendulum, so as to maintain a tilt angle of the payload supporting part to a desired tilt angle (so as to prevent the payload supporting part from fall due to tilting).

As a control technology of this type of the inverted pendulum type vehicle, for example, the one found in Patent Document 1 had been proposed by the present applicant.

In the Patent Document 1, there is disclosed a control technology of an inverted pendulum type vehicle in which a base body of a vehicle assembled with a payload supporting part of an occupant is provided so as to be freely tiltable about two axes, specifically about one axis in a longitudinal direction and about the other axis in a lateral direction, with respect to the ball-shaped traveling motion unit. In this technology, the vehicle is made to travel by determining a torque command value of an electric motor as the actuator, so as to converge a measured value of a tilt angle of the payload supporting part (tilt angles about two axis of a fore-and-aft direction and a lateral direction) to a necessary desired tilt angle, and also to converge a measured value of a traveling velocity in the fore-and-aft direction and the lateral direction of the vehicle to a desired velocity, and performing operation control of the electric motor in accordance with the torque command value.

The present applicant further proposes vehicles capable of functioning as the inverted pendulum type vehicle, such as those found in Patent Document 2 and 3.

PRIOR ART REFERENCES

Patent Documents

Patent document 1: U.S. Pat. No. 3,070,015
Patent document 2: Published PCT International Applications WO/2008/132778
Patent document 3: Published PCT International Applications WO/2008/132779

SUMMARY OF THE INVENTION

Problems to be Solved by the Invention

In the inverted pendulum type vehicle disclosed in patent documents 1 through 3, it is preferable that the payload supporting part is autonomously maintained to a state in which the payload supporting part does not fall by tilting, even in a state where an occupant is not aboard the vehicle.

In this case, it is preferable that, during non-boarding of the occupant, the traveling motion unit is maintained static or in a state closer thereto as much as possible, despite the inclination of the floor surface or the like.

On the other hand, in the case where the occupant is aboard, it is conceivable that it is preferable for the occupant that the vehicle starts to move smoothly in accordance with the tilting of the payload supporting part or the base body, even when the desired velocity of the vehicle is 0.

Hence, in the conventional technique such as that shown in the patent document 1, sufficient attention was not applied to such request. As such, there were concerns that the vehicle may wobble in the state where the occupant is not aboard the vehicle, or the vehicle may be difficult to move in the case where the occupant is aboard the vehicle.

The same applies to the inverted pendulum type vehicle not only for boarding the occupant (human) on the vehicle but also to the inverted pendulum type vehicle used for labor such as mounting and transporting an object to be transported, such as a luggage.

The present invention has been made in view of such background, and aims to provide an inverted pendulum type vehicle capable of achieving a state in which the vehicle is difficult to move in a state where an object to be transported is not mounted, and achieving a state in which the vehicle is easy to move in a state where the object to be transported is mounted thereon.

Means for Solving the Problems

To fulfill the object, a control device of an inverted pendulum type vehicle of the present invention is a control device of an inverted pendulum type vehicle having a traveling motion unit capable of moving on a floor surface at least in a first direction, an actuator which drives the traveling motion unit, a base body on which the traveling motion unit and the actuator are mounted, and a loading part of an object to be transported mounted to the base body so as to be tillable at least with respect to a vertical direction about an axis in a second direction which is orthogonal to the first direction, comprising:

a traveling motion unit controlling element which controls the traveling motion of the traveling motion unit via the actuator, in each operation mode of a loaded state mode and a non-loaded state mode that are operation modes of the vehicle for controlling the traveling motion unit, the loaded state mode being the operation mode in which the object to be transported is loaded on the loading part, and the non-loaded state mode being the operation mode in which the object to be transported is not loaded on the loading part;

wherein the traveling motion unit controlling element controls the traveling motion unit, by executing a control processing which is configured to make an actual traveling velocity of a predetermined representative point of the vehicle converge to a steady-state converging velocity which depends on a tilt error, the tilt error being an error between an actual tilt angle of the loading part and a desired tilt angle of a predetermined value for each mode, at least in a steady state in which the tilt error is maintained constant, and at the same time to make the steady-state converging velocity in the first direction change monotonously in accordance with the tilt error about an axis in the second direction, and also to make a ratio of a magnitude of the steady-state converging velocity in the first direction with respect to a magnitude of the tilt error about the axis in the second direction relatively smaller in the non-loaded state mode than in the loaded state mode (a first aspect of the invention).

In the present invention, the term "floor" will be used to include an outdoor ground surface or a road surface rather than meaning only a floor in an ordinary sense (e.g., an indoor floor).

According to the first aspect of the invention, the traveling motion unit controlling element controls the traveling motion unit, by executing the control processing configured to at least make the ratio of the magnitude of the steady-state converging velocity in the first direction with respect to the magnitude of the tilt error about the axis in the second direction relatively smaller in the non-loaded state mode than in the loaded-state mode.

Supposing a case where the payload supporting part is tilted in order to change the tilt error about the axis in the second direction in each operation mode of the loaded state mode and the non-loaded state mode by the same angle from the desired tilt angle, the magnitude of the steady-state converging velocity in the first direction in the steady-state after tilting is relatively smaller in the operation mode of the non-loaded state mode than in the loaded state mode.

Further, the steady-state converging velocity in the first direction changes monotonously in accordance with the tilt error about the axis in the second direction, so that the magnitude of the steady-state converging velocity in the first direction becomes smaller as the magnitude of the tilt error about the axis in the second direction is smaller, in each of the operation mode.

As such, with respect to the increase in the magnitude of the tilt error about the axis in the second direction, the magnitude of the actual traveling velocity of the representative point in the first direction becomes relatively easier to increase with good sensitivity in the loaded state mode than in the non-loaded state mode, and on the other hand, becomes relatively difficult to increase in the non-loaded state mode than in the loaded state mode.

Therefore, according to the first aspect of the invention, it becomes possible to achieve a state in which the vehicle is relatively difficult to move in accordance with the tilting of the loading part about the axis in the second direction, in a state where the object to be transported is not mounted on the loading part, and also to achieve a state in which the vehicle is relatively easy to move in accordance with the tilting of the loading part about the axis in the second direction, in a state where the object to be transported is mounted on the loading part.

Supplementarily, in the first aspect of the invention, the traveling motion unit may be either one of the unit capable of moving only in the first direction, and the unit capable of moving in all directions including the first direction and the second direction, as will be described later. In the case where the traveling motion unit is configured to be capable of moving in all directions including the first direction and the second direction, the traveling velocity of the representative point in the case where the direction is not specifically mentioned comprises a velocity component in the first direction (the traveling velocity in the first direction) and a velocity component in the second direction (the traveling velocity in the second direction). On the other hand, in the case where the traveling motion unit is configured to be capable of moving only in the first direction (only in one direction), then the traveling velocity of the representative point in the case where the direction is not specifically mentioned coincides with the traveling velocity in the first direction.

Further, in the case where the traveling motion unit is configured to be capable of moving in all directions including the first direction and the second direction, the payload supporting part may be mounted to the base body so as to be tiltable with respect to the vertical direction about two axes of about the axis in the first direction and about the axis in the second direction. In the case where the payload supporting part is tiltable about two axes, the tilt angle or the tilt error of the payload supporting part in the case where the tilting axis is not specifically mentioned comprises a component about the axis in the first direction (the tilt angle or the tilt error about the axis in the first direction) and a component about the axis in the second direction (the tilt angle or the tilt error about the second axis). On the other hand, in the case where the payload supporting part is tiltable only about the axis in the second direction (only about one axis), then the tilt angle or the tilt error of the payload supporting part in the case where the tilt angle is not specifically mentioned coincides with the tilt angle and tilt error about the axis in the second direction, respectively.

Further, of the desired tilt angle of the predetermined value for each mode, as the desired tilt angle for the loaded state mode, for example, it is preferable to adopt the tilt angle of the loading part in the state where the overall center-of-gravity point of the parts tiltable integrally with the loading part (which includes the object to be transported), out of the total including the object to be transported loaded on the loading part and the vehicle, is positioned immediately above or approximately immediately above a tilting center (a fulcrum of tilting) of the loading part (that is, in the state where a moment generated about the tilting center becomes 0 or approximately 0, by a gravity acting on the center-of-gravity point).

Similarly, as the desired tilt angle for the non-loaded state mode, for example, it is preferable to adopt the tilt angle of the loading part in the state where the overall center-of-gravity point of the parts tiltable integrally with the loading part, out of the stand-alone vehicle, is positioned immediately above or approximately immediately above a tilting center (a fulcrum of tilting) of the loading part (that is, in the state where a moment generated about the tilting center becomes 0 or approximately 0, by a gravity acting on the center-of-gravity point). The desired tilt angle for the non-loaded state mode may coincide with the desired tilt angle for the loaded state mode.

Further, as the representative point, the center-of-gravity point or a point in the vicinity thereof, or a point in a predetermined part in the traveling motion unit or the base body may be used. The representative point is preferably set to a point in which the traveling velocity of the representative point becomes identical or almost identical to the traveling motion unit in a state where the tilt angle of the payload supporting part is maintained constant.

According to such first aspect of the present invention, as is mentioned above, the traveling motion unit is configured to be capable of moving in all directions including the first direction and the second direction, and the loading part may be mounted to the base body tiltably about the two axes of about the axis in the first direction and about the axis in the second direction.

In this case, it is preferable that the control processing executed by the traveling motion unit controlling element is configured to make the steady-state converging velocity in the second direction change monotonously in accordance with the tilt error about the axis in the first direction, in addition to making the steady-state converging velocity in the first direction change monotonously in accordance with the tilt error about the axis in the second direction (a second aspect of the invention).

In the present invention, the traveling motion unit "being capable of moving in all directions, including the first direction and the second direction" means that the orientation of the velocity vector of the traveling motion unit at each instant observed in an axial direction orthogonal to the first direction and the second direction could take an orientation of an arbitrary angular orientation about the aforesaid axial direction when the traveling motion unit is driven by the actuator. In this case, the aforesaid axial direction is approximately a vertical direction or a direction perpendicular to a floor surface. Further, the term "orthogonal" in the present invention does not have to be orthogonal in a strict sense, and may slightly deviate from being orthogonal in the strict sense as long as it does not deviate from the nature of the present invention.

According to the second aspect of the invention mentioned above, it is possible to make the vehicle travel in all directions including the first direction and the second direction, by tilting the loading part in either one of about the axis in the first direction and about the axis in the second direction, or about both axes, in either operation mode of the loaded state mode and the non-loaded state mode.

In the second aspect of the invention, the control processing executed by the traveling motion unit controlling element may be configured so as to make the ratio of the magnitude of the steady-state converging velocity in the second direction with respect to the magnitude of the tilt error about the axis in the first direction be, for example, the same or approximately the same at a relatively small ratio in the loaded state mode and the non-loaded state mode. That is, the vehicle may be made difficult to move in accordance with the tilting of the loading part about the axis in the first direction in a similar manner in both of the loaded state mode and the non-loaded state mode.

However, the control processing executed by the traveling motion unit controlling element may be configured to make the ratio of the magnitude of the steady-state converging velocity in the first direction with respect to the magnitude of the tilt error about the axis in the second direction and the ratio of the magnitude of the steady-state converging velocity in the second direction with respect to the magnitude of the tilt error about the axis in the first direction, respectively, become relatively smaller in the non-loaded state mode than in the loaded state mode (a third aspect of the invention).

According to the third aspect of the invention, similar to the case of tilting the loading part about the axis in the second direction, with respect to the increase in the magnitude of the tilt error about the axis in the first direction, the magnitude of the actual traveling velocity of the representative point in the second direction becomes relatively easier to increase with good sensitivity in the loaded state mode than in the non-loaded state mode, and on the other hand, becomes relatively difficult to increase in the non-loaded state mode than in the loaded state mode.

Therefore, in the state where the object to be transported is not loaded on the loading part, it becomes possible to achieve the state where the vehicle is relatively difficult to move in accordance with the tilting of the loading part, regardless of the orientation of the tilting of the loading part, and as well as to achieve the state where the vehicle is relatively easy to move in accordance with the tilting of the loading part, regardless of the orientation of the tilting of the loading part in a state where the object to be transported is loaded on the loading part.

In the second or the third aspect of the invention, in the case where the object to be transported is for example an occupant (a person), then the loading part may be configured so that the occupant as the object to be transported is capable of boarding with a fore-and-aft direction and a lateral direction of the occupant coinciding with the first direction and the second direction, respectively. In this case, the control processing executed by the traveling motion unit controlling element is preferably configured to make the ratio of the magnitude of the steady-state converging velocity in the second direction with respect to the magnitude of the tilt error about the axis in the first direction become relatively smaller than the ratio of the magnitude of the steady-state converging velocity in the first direction with respect to magnitude of the tilt error about the axis in the second direction, at least in the loaded state mode among the loaded state mode and the non-loaded state mode (a fourth aspect of the invention).

According to the fourth aspect of the invention, at least in the loaded state mode, when comparing the travel of the vehicle in accordance with the tilting of the loading part about the axis in the lateral direction of the occupant (the second direction), and the travel of the vehicle in accordance with the tilting of the loading part about the axis in the fore-and-aft direction of the occupant (the first direction), the vehicle is relatively easier to move in the fore-and-aft direction of the occupant (stated otherwise, in the standard direction as the traveling direction of the vehicle) in the former case, and on the other hand, the vehicle is relatively difficult to move in the lateral direction of the occupant in the latter case. As a result, it becomes possible to easily carry out maneuvering of the vehicle (tilting of the loading part) in the case of moving the vehicle to the fore-and-aft direction of one's self or in a direction close thereto.

Supplementarily, in the fourth aspect of the invention, the control processing executed by the traveling motion unit controlling element may be configured so that the ratio of the magnitude of the steady-state converging velocity in the second direction with respect to the magnitude of the tilt error about the axis in the first direction becomes relatively smaller than the ratio of the magnitude of the steady-state converging velocity in the first direction with respect to the magnitude of the tilt error about the axis in the second direction, in both operation modes of the loaded state mode and the non-loaded state mode. However, the control processing may be configured so that, in the non-loaded state mode, the ratio of the magnitude of the steady-state converging velocity in the second direction with respect to the magnitude of the tilt error about the axis in the first direction becomes, for example, the same or approximately the same as the ratio of the magnitude of the steady-state converging velocity in the first direction with respect to the magnitude of the tilt error about the axis in the second direction at a relatively small ratio.

In the first through fourth aspect of the invention, it is preferable to adopt an embodiment as is explained below as a more specific embodiment.

That is, in the first aspect of the invention, it is preferable that the control device further comprises a tilt angle measuring element which generates an output in accordance with the actual tilt angle of the loading part, and a representative point velocity measuring element which generates an output in accordance with the actual traveling velocity of the representative point, wherein the traveling motion unit controlling element is an element which sequentially determines, with the control processing, in each operation mode, manipulated variables for control at least including a first manipulated variable for control which defines a driving power to be applied to the traveling motion unit in order to make the traveling motion unit travel in the first direction, and which controls the traveling motion of the traveling motion unit in accordance with the determined manipulated variables for control via the actuator, the control processing includes a first manipulated variable for control determination process which determines the first manipulated variable for control such that the tilt error about the axis in the second direction and the traveling velocity of the representative point in the first direction are brought closer to 0, at least by combining a first A manipulated variable component, which is obtained by multiplying a first A gain coefficient for each operation mode by the tilt error about the axis in the second direction calculated from a measured value of the tilt angle of the loading part represented by the output of the tilt angle measuring element and the desired tilt angle thereof, and a first B manipulated variable component, which is obtained by multiplying a first B coefficient for each operation mode by a measured value of the traveling velocity of the representative point in the first direction represented by the output of the representative point velocity measuring element, and values of the first A gain coefficient and the first B coefficient for each operation mode used in the first manipulated variable for control determination process are set so that a ratio of an absolute value of the first A gain coefficient with respect to an absolute value of the first B gain coefficient for the non-loaded state mode becomes relatively smaller than a ratio of an absolute value of the first A gain coefficient with respect to an absolute value of the first B gain coefficient for the loaded state mode, so as to make the ratio of the magnitude of the steady-state converging velocity in the first direction with respect to the magnitude of the tilt error about the axis in the second direction become relatively smaller in the non-loaded state mode than in the loaded state mode (a fifth aspect of the invention).

According to the fifth aspect of the invention, the first A manipulated variable component obtained by multiplying the tilt error about the axis in the second direction by the first A gain coefficient for each operation mode has a meaning of defining the driving force to be applied to the traveling motion unit in order to converge the tilt error about the axis in the second direction to 0. Further, the first B manipulated variable component obtained by multiplying the measured value of the traveling velocity of the representative point in the first direction by the first B gain coefficient for each operation mode has a meaning of defining the driving force to be applied to the traveling motion unit in order to converge the traveling velocity of the representative point in the first direction to 0. Then, the driving force defined by the first manipulated variable for control is obtained at least by combining the driving force defined by the first A manipulated variable component and the driving force defined by the first B manipulated variable component.

Therefore, in each operation mode of the loaded state mode and the non-loaded state mode, the ratio of the magnitude of the steady-state converging velocity in the first direction with respect to the magnitude of the tilt error about the axis in the second direction (hereinafter, sometimes referred to as a first tilt error-velocity ratio) becomes the ratio in accordance with the ratio of the absolute value of the first A gain coefficient with respect to the absolute value of the first B gain coefficient in each operation mode (hereinafter, sometimes referred to as a first gain ratio). More specifically, as the first gain ratio becomes smaller, the first tilt error-velocity ratio becomes smaller.

Therefore, by setting the values of the first A gain coefficient and the first B gain coefficient for each operation mode so that the first gain ratio in the non-loaded state mode becomes relatively smaller than the first gain ratio in the loaded state mode, it becomes possible to make the first tilt error-velocity ratio become relatively smaller in the non-loaded state mode than in the loaded state mode.

Further, in the second or the third aspect of the invention, it is preferable that the control device further comprises a tilt angle measuring element which generates an output in accordance with the actual tilt angle of the loading part, and a representative point velocity measuring element which generates an output in accordance with the actual traveling velocity of the representative point, wherein the traveling motion unit controlling element is an element which sequentially determines, with the control processing, in each operation mode, manipulated variables for control comprising a first manipulated variable for control which defines a driving power to be applied to the traveling motion unit in order to make the traveling motion unit travel in the first direction and a second manipulated variable for control which defines a driving power to be applied to the traveling motion unit in order to make the traveling motion unit travel in the second direction, and which controls the traveling motion of the traveling motion unit in accordance with the determined manipulated variables for control via the actuator, the control processing includes a first manipulated variable for control determination process which determines the first manipulated variable for control such that the tilt error about the axis in the second direction and the traveling velocity of the representative point in the first direction are brought closer to 0, at least by combining a first A manipulated variable component, which is obtained by multiplying a first A gain coefficient for each operation mode by the tilt error about the axis in the second direction calculated from a measured value of the tilt angle of the loading part represented by the output of the tilt angle measuring element and the desired tilt angle thereof, and a first B manipulated variable component, which is obtained by multiplying a first B gain coefficient for each operation mode by a measured value of the traveling velocity of the representative point in the first direction represented by the output of the representative point velocity measuring element, and a second manipulated variable for control determination process which determines the second manipulated variable for control such that the tilt error about the axis in the first direction and the traveling velocity of the representative point in the second direction are brought closer to 0, at least by combining a second A manipulated variable component, which is obtained by multiplying a second A gain coefficient for each operation mode by the tilt error about the axis in the first direction calculated from a measured value of the tilt angle of the loading part represented by the output of the tilt angle measuring element and the desired tilt angle thereof, and a second B manipulated variable component, which is obtained by multiplying a second B gain coefficient for each operation mode by a measured value of the traveling velocity of the representative point in the second direction represented by the output of the representative point velocity measuring element, values of the first A gain coefficient and the first B gain coefficient for each operation mode used in the first manipulated variable for control determination process are set so that a ratio of an absolute value of the first A gain coefficient with respect to an absolute value of the first B gain coefficient for the non-loaded state mode becomes relatively smaller than a ratio of an absolute value of the first A gain coefficient with respect to an absolute value of the first B gain coefficient for the loaded state mode, so as to make the ratio of the magnitude of the steady-state converging velocity in the first direction with respect to the magnitude of the tilt error about the axis in the second direction become relatively smaller in the non-loaded state mode than in the loaded state mode.

And, specifically in the third aspect of the invention, it is preferable that values of the second A gain coefficient and the second B gain coefficient for each operation mode used in the second manipulated variable for control determination process are set so that a ratio of an absolute value of the second A gain coefficient with respect to an absolute value of the second B gain coefficient for the non-loaded state mode becomes relatively smaller than a ratio of an absolute value of the second A gain coefficient with respect to an absolute value of the second B gain coefficient for the loaded state mode, so as to make the ratio of the magnitude of the steady-state converging velocity in the second direction with respect to the magnitude of the tilt error about the axis in the first direction become relatively smaller in the non-loaded state mode than in the loaded state mode (a sixth aspect of the invention).

According to the sixth aspect of the invention, the second A manipulated variable component obtained by multiplying the tilt error about the axis in the first direction by the second A gain coefficient for each operation mode has a meaning of defining the driving force to be applied to the traveling motion unit in order to converge the tilt error about the axis in the first direction to 0. Further, the second B manipulated variable component obtained by multiplying the measured value of the traveling velocity of the representative point in the second direction by the second B gain coefficient for each operation mode has a meaning of defining the driving force to be applied to the traveling motion unit in order to converge the traveling velocity of the representative point in the second direction to 0. Then, the driving force defined by the second manipulated variable for control is obtained at least by combining the driving force defined by the second A manipulated variable component and the driving force defined by the second B manipulated variable component.

Therefore, according to the sixth aspect of the invention, in each operation mode of the loaded state mode and the non-loaded state mode, in addition to making the first tilt error-velocity ratio be in accordance with the first gain coefficient, the ratio of the magnitude of the steady-state converging velocity in the second direction with respect to the magnitude of the tilt error about the axis in the first direction (hereinafter, sometimes referred to as a second tilt error-velocity ratio) becomes the ratio in accordance with the ratio of the absolute value of the second A gain coefficient with respect to the absolute value of the second B gain coefficient in each operation mode (hereinafter, sometimes referred to as a second gain ratio), similarly to the fifth aspect of the invention. More specifically, as the second gain ratio becomes smaller, the second tilt error-velocity ratio becomes smaller.

Therefore, similarly to the fifth aspect of the invention, by setting the values of the first A gain coefficient and the first B gain coefficient in each operation mode so that the first gain ratio in the non-loaded state mode becomes relatively smaller than the first gain ratio in the loaded state mode, it becomes possible to make the first tilt error-velocity ratio become relatively smaller in the non-loaded state mode than in the loaded state mode.

In addition, by setting the values of the second A gain coefficient and the second B gain coefficient for each operation mode so that the second gain ratio in the non-loaded state mode becomes relatively smaller than the second gain ratio in the loaded state mode, it becomes possible to make the second tilt error-velocity ratio become relatively smaller in the non-loaded state mode than in the loaded state mode.

Further, in the fourth aspect of the invention, it is preferable that the control device further comprises a tilt angle measuring element which generates an output in accordance with the actual tilt angle of the loading part, and a representative point velocity measuring element which generates an output in accordance with the actual traveling velocity of the representative point, wherein the traveling motion unit controlling element is an element which sequentially determines, with the control processing, in each operation mode, manipulated variables for control comprising a first manipulated variable for control which defines a driving power to be applied to the traveling motion unit in order to make the traveling motion unit travel in the first direction and a second manipulated variable for control which defines a driving power to be applied to the traveling motion unit in order to make the traveling motion unit travel in the second direction, and which controls the traveling motion of the traveling motion unit in accordance with the determined manipulated variables for control via the actuator, the control processing includes a first manipulated variable for control determination process which determines the first manipulated variable for control such that the tilt error about the axis in the second direction and the traveling velocity of the representative point in the first direction are brought closer to 0, at least by combining a first A manipulated variable component, which is obtained by multiplying a first A gain coefficient for each operation mode by the tilt error about the axis in the second direction calculated from a measured value of the tilt angle of the loading part represented by the output of the tilt angle measuring element and the desired tilt angle thereof, and a first B manipulated variable component, which is obtained by multiplying a first B coefficient for each operation mode with a measured value of the traveling velocity of the representative point in the first direction represented by the output of the representative point velocity measuring element, and a second manipulated variable for control determination process which determines the second manipulated variable for control such that the tilt error about the axis in the first direction and the traveling velocity of the representative point in the second direction are brought closer to 0, at least by combining a second A manipulated variable component, which is obtained by multiplying a second A gain coefficient for each operation mode by the tilt error about the axis in the first direction calculated from a measured value of the tilt angle of the loading part represented by the output of the tilt angle measuring element and the desired tilt angle thereof, and a second B manipulated variable component, which is obtained by multiplying a second B gain coefficient for each operation mode by a measured value of the traveling velocity of the representative point in the second direction represented by the output of the representative point velocity measuring element, and values of the first A gain coefficient, the first B gain coefficient, the second A gain coefficient and the second B gain coefficient for the loaded state mode used in the first manipulated variable for control determination process are set so that a ratio of an absolute value of the second A gain coefficient with respect to an absolute value of the second B gain coefficient for the loaded state mode becomes relatively smaller than a ratio of an absolute value of the first A gain coefficient with respect to an absolute value of the first B gain coefficient for the loaded state mode, so as to make the ratio of the magnitude of the steady-state converging velocity in the second direction with respect to the magnitude of the tilt error about the axis in the first direction relatively smaller than the ratio of the magnitude of the steady-state converging velocity in the first direction with respect to the magnitude of the tilt error about the axis in the second direction in the loaded state mode (a seventh aspect of the invention).

According to the sixth aspect of the invention, similarly to the seventh aspect of the invention, in each operation mode of the loaded state mode and the non-loaded state mode, the first tilt error-velocity ratio becomes a ratio in accordance with the first gain ratio, and the second tilt error-velocity ratio becomes a ratio in accordance with the second gain ratio. Further, in the seventh aspect of the invention, especially in the loaded state mode, by setting the values of the first A gain coefficient, the first B gain coefficient, the second A gain coefficient, and the second B gain coefficient for the loaded state mode so that the second gain coefficient becomes relatively smaller than the first gain coefficient, it becomes possible to make the second tilt error-velocity ratio become relatively smaller than the first tilt error-velocity ratio.

Also, the seventh aspect of the invention may be combined with the sixth aspect of the invention. That is, in the sixth aspect of the invention, the values of the first A gain coefficient, the first B gain coefficient, the second A gain coefficient, and the second B gain coefficient for the loaded state mode may be set similarly to those in the seventh aspect of the invention.

Supplementarily, in the first manipulated variable for control determination process in the fifth through seventh aspect of the invention, for example, the first manipulated variable for control may be determined by combining the first A manipulated variable component, the first B manipulated variable component, and a first C manipulated variable component, which is obtained by multiplying a temporal change rate (angular velocity) of the measured value of the tilt angle of the loading part about the axis in the second direction by a first C gain coefficient. Further, in the second manipulated variable for control determination process in the sixth and the seventh aspect of the invention, for example, the second manipulated variable for control may be determined by combining the second A manipulated variable component, the second B manipulated variable component, and a second C manipulated variable component, which is obtained by multiplying a temporal change rate (angular velocity) of the measured value of the tilt angle of the loading part about the axis in the first direction by a second C gain coefficient.

MODE FOR CARRYING OUT THE INVENTION

The following will describe a first embodiment of the present invention. First, referring to FIG. 1 to FIG. 6, the structure of an inverted pendulum type vehicle in the present embodiment will be described.

Figure 1:
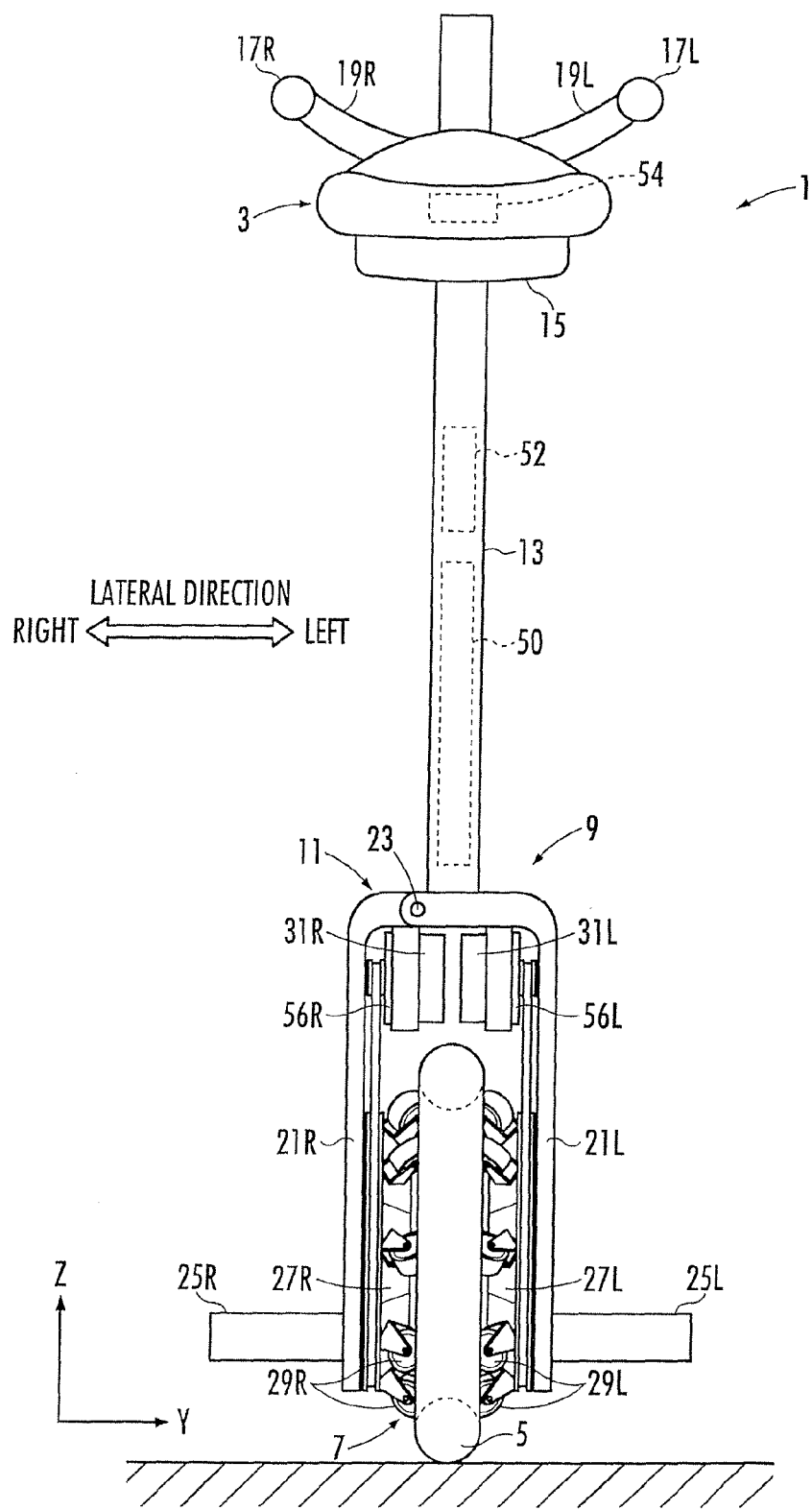
FIG. 1 is a front diagram of an inverted pendulum type vehicle according to an embodiment.
Figure 2:
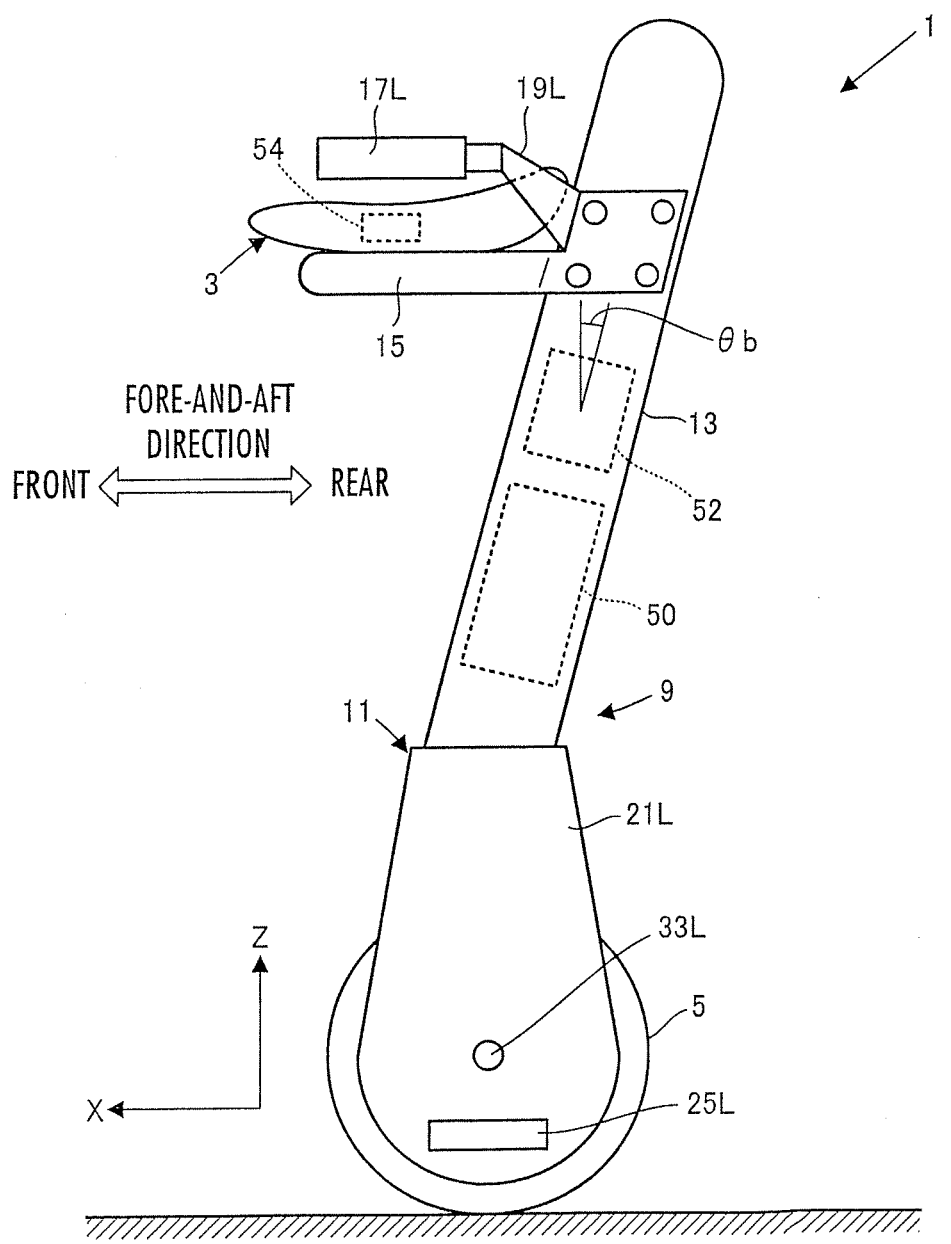
FIG. 2 is a side view of the inverted pendulum type vehicle according to the embodiment.

As illustrated in FIG. 1 and FIG. 2, an inverted pendulum type vehicle 1 in the present embodiment includes a payload supporting part 3 for an occupant (driver) as an object to be transported of the vehicle 1, a traveling motion unit 5 capable of traveling in all directions (two-dimensional all directions, including a fore-and-aft direction and a lateral direction) on a floor surface while being in contact with a floor surface, an actuator 7 which imparts, to the traveling motion unit 5, a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of an occupant aboard the payload supporting part 3 in a normal posture. Incidentally, "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side, respectively, of the vehicle 1.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part (a loading part of the object to be transported) for an occupant. Hence, the inverted pendulum type vehicle 1 in the present embodiment (hereinafter referred to simply as the vehicle 1) travels on a floor surface with an occupant seated on the seat 3.

Further, grips 17R and 17L to be grasped as necessary by the occupant seated on the seat 3 are disposed on the right and left of the seat 3. These grips 17R and 17L are secured to the distal portions of brackets 19R and 19L, respectively, which are provided extendedly from the support frame 13 (or the seat frame 15).

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the occupant seated on the seat 3 rests his/her right foot and a step 25L on which the occupant rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of patent document 2 mentioned above. Hence, in the description of the present embodiment, the aspects of the structures of the traveling motion unit 5 and the actuator 7 which are described in the aforesaid patent document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the aforesaid rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 21L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
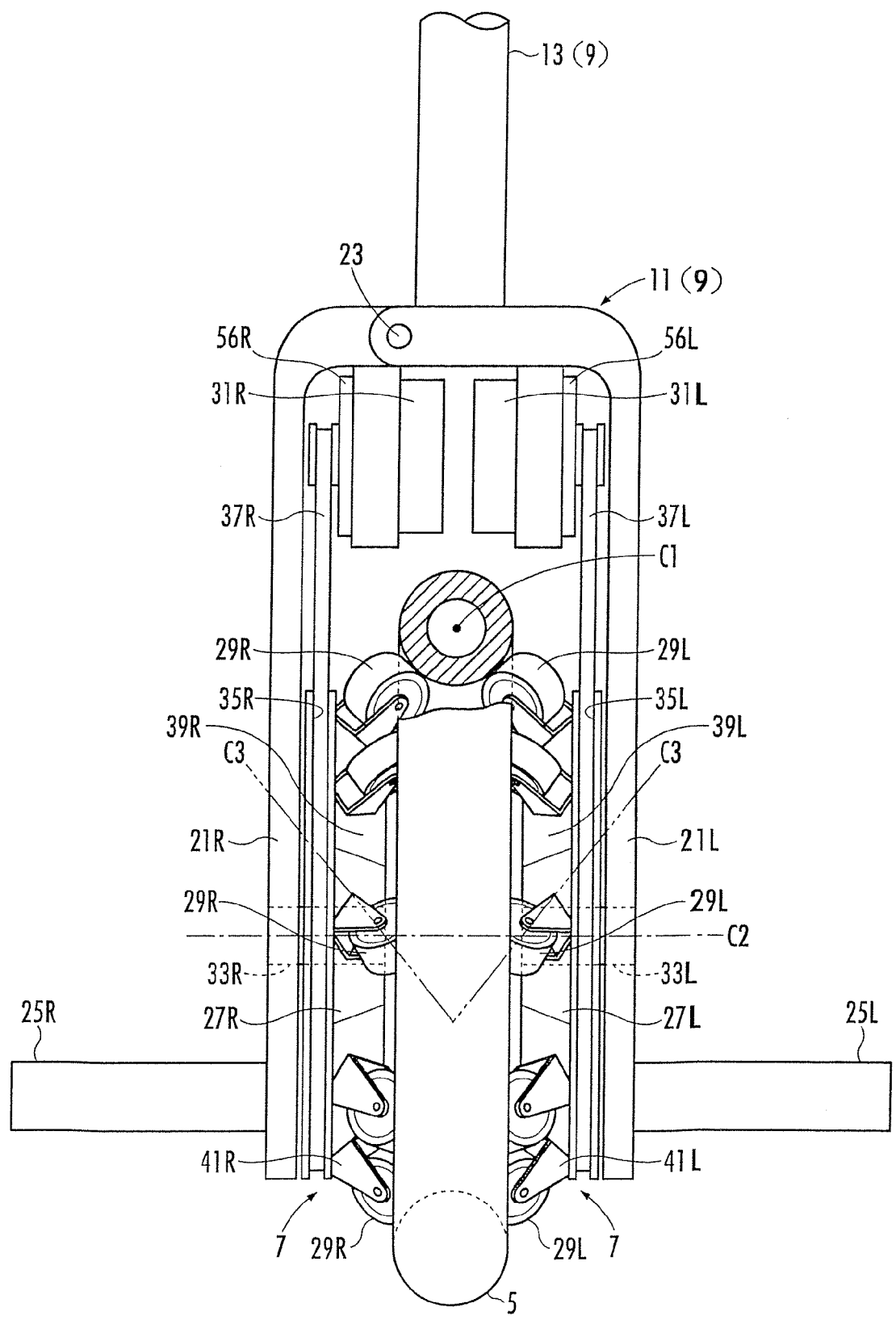
FIG. 3 is an enlarged view of a lower portion of the inveted pendulum type vehicle according to the embodiment.
Figure 4:
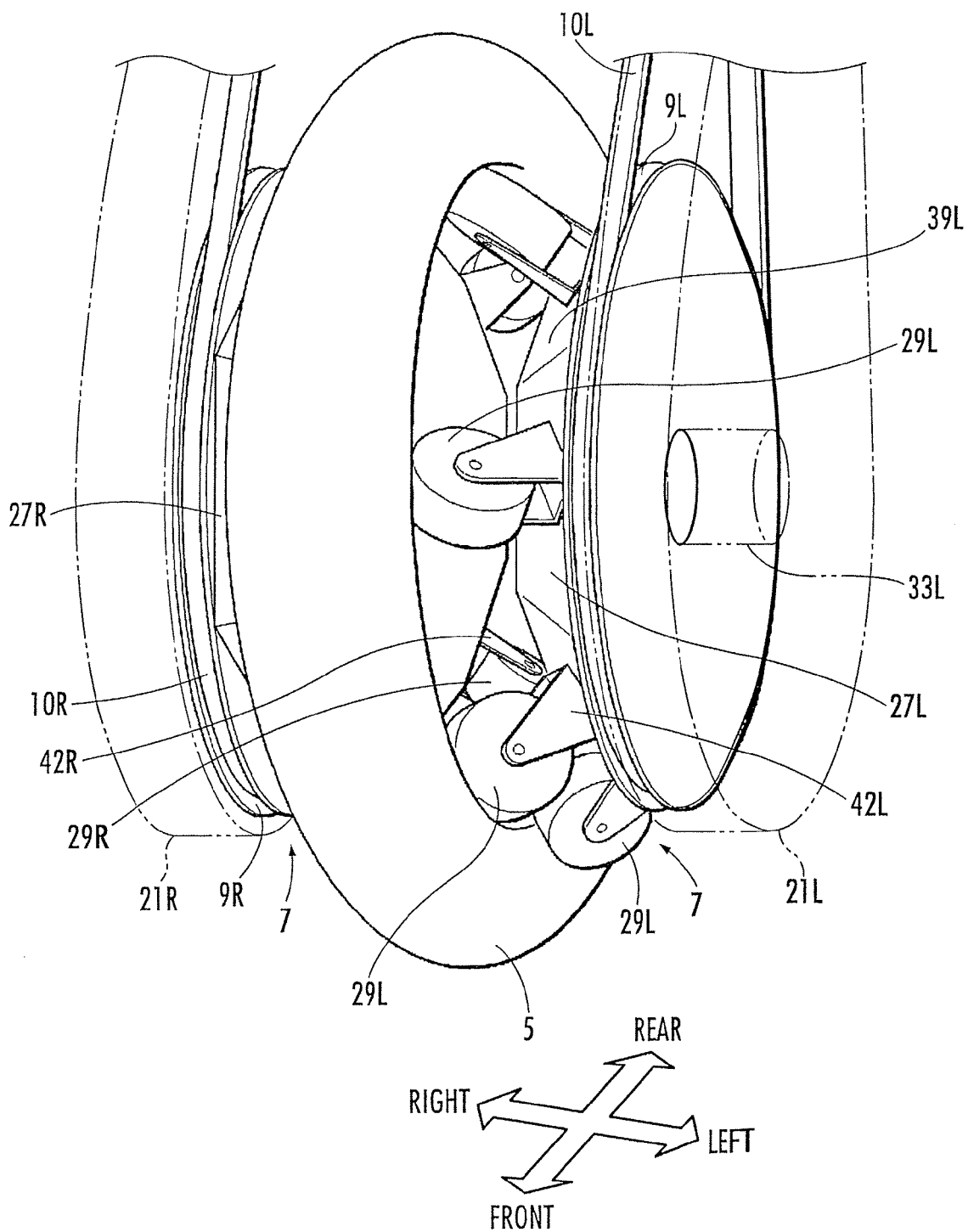
FIG. 4 is a perspective view of the lower portion of the inverted pendulum type vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. Each power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

Incidentally, the aforesaid power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
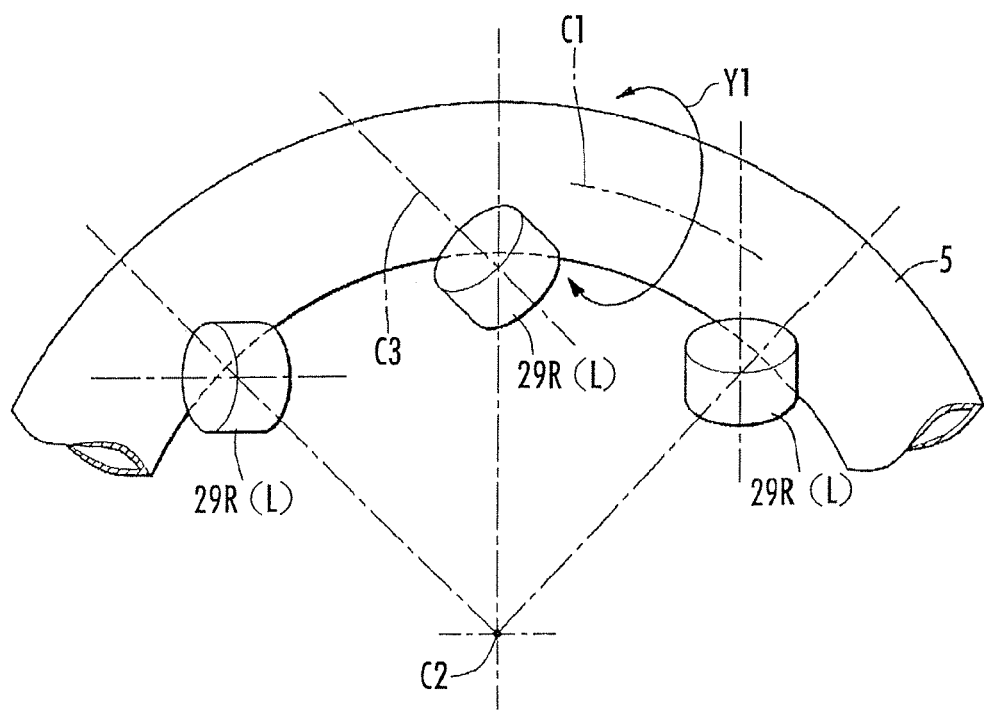
FIG. 6 is a diagram illustrating the placement relationship between the traveling motion unit (wheel unit) and free rollers of the inverted pendulum type vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the aforesaid postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5).

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the aforesaid rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

Incidentally, the seat (the boarding portion) 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point.

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward.

In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, in a state wherein no occupant is aboard the vehicle 1, the posture of the base body 9 in a state which the center-of-gravity point of the vehicle 1 alone is positioned substantially right above the central point of the wheel assembly 5 (the central point on the axial center C2) (more precisely, a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Further, in either state of the state where the occupant is aboard the vehicle 1 and the state where the occupant is not aboard the vehicle 1, the traveling motion of the wheel assembly 5 is controlled so that the moving velocity of the vehicle 1 increases as the deviation of the actual posture of the base body 9 from the desired posture increases, and the traveling of the vehicle 1 stops in the state where the actual posture of the base body 9 coincides with the desired posture.

Supplementally, "the posture" means a spatial orientation. In the present embodiment, when the base body 9 tilts together with the seat 3, the postures of the base body 9 and the seat 3 change. Further, in the present embodiment, the base body 9 and the seat 3 integrally tilt, so that converging the posture of the base body 9 to the desired posture is equivalent to converging the posture of the seat 3 to a desired posture associated with the seat 3 (the posture of the seat 3 in a state wherein the posture of the base body 9 coincides with a desired posture of the base body 9).

According to the present embodiment, in order to control the operation of the vehicle 1 as described above, a control unit 50 composed of an electronic circuit unit which mainly includes a microcomputer and a drive circuit unit for the electric motors 31R and 31L, a tilt sensor 52 for measuring a tilt angle $\theta b$ relative to the vertical direction (the gravitational direction) of a predetermined portion of the base body 9 and a changing velocity thereof ($=d\theta b/dt$), a load sensor 54 for detecting whether or not an occupant is aboard the vehicle 1, and rotary encoders 56R and 56L serving as angle sensors for detecting the rotational angles and the rotational angular velocities of the output shafts of the electric motors 31R and 31L, respectively, are mounted at appropriate places of the vehicle 1, as illustrated in FIG. 1 and FIG. 2.

In this case, the control unit 50 and the tilt sensor 52 are installed to the support frame 13 by, for example, being accommodated in the support frame 13 of the base body 9. Further, the load sensor 54 is incorporated in the seat 3. Further, the rotary encoders 56R and 56L are provided integrally with the electric motors 31R and 31L. The rotary encoders 56R and 56L may alternatively be attached to the rotating members 27R and 27L, respectively.

More specifically, the aforesaid tilt sensor 52 is composed of an acceleration sensor and a rate sensor (angular velocity sensor), such as a gyro sensor, and outputs detection signals of these sensors to the control unit 50. Then, the control unit 50 carries out predetermined measurement arithmetic processing (this may be publicly known arithmetic processing) on the basis of the outputs of the acceleration sensor and the rate sensor of the tilt sensor 52 thereby to calculate the measured value of the tilt angle $\theta b$ of the portion, to which the tilt sensor 52 is installed (the support frame 13 in the present embodiment), relative to the vertical direction and the measured value of the tilt angular velocity $\theta bdot$, which is a change rate (differential value) thereof.

In this case, to be more specific, the tilt angle $\theta b$ to be measured (hereinafter referred to a base body tilt angle $\theta b$ in some cases) is composed of a component in the direction about the Y-axis (a pitch direction) $\theta b\_x$ and a component in the direction about the X-axis (a roll direction) $\theta b\_y$. Similarly, the tilt angular velocity $\theta bdot$ to be measured (hereinafter referred to a base body tilt angular velocity $\theta bdot$ in some cases) is composed of a component in the direction about the Y-axis (the pitch direction) $\theta bdot\_x$ ($=d\theta b\_x/dt$) and a component in the direction about the X-axis (the roll direction) $\theta bdot\_y$ ($=d\theta b\_y/dt$).

Supplementally, according to the present embodiment, the seat 3 tilts integrally with the support frame 13 of the base body 9, so that the base body tilt angle $\theta b$ also has a meaning as the tilt angle of the payload supporting part 3.

In the description of the present embodiment, regarding variables, such as a motional state amount having components in directions of the X-axis and the Y-axis, such as the aforesaid base body tilt angle $\theta b$ (or directions about each axes), or variables, such as coefficients related to the motional state amount, the reference characters of the variables will be accompanied by a suffix "\_x" or "\_y" to distinguishably denote the components.

In this case, for the variables related to translational motions, such as a translational velocity, a component in the X-axis direction thereof will be accompanied by the suffix "\_x" and a component in the Y-axis direction thereof will be accompanied by the suffix "\_y."

Meanwhile, regarding the variables related to rotational motions, such as angles, rotational velocities (angular velocities), and angular acceleration, for the purpose of convenience, a component in the direction about the Y-axis will be accompanied by the suffix "\_x" and a component in the direction about the X-axis will be accompanied by the suffix "\_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "\_xy" is added to the reference character of the variable. For example, to express the aforesaid base body tilt angle $\theta b$ in the form of the pair of a component in the direction about the Y-axis $\theta b\_x$ and a component in the direction about the X-axis $\theta b\_y$, the pair will be denoted by "the base body tilt angle $\theta b\_xy$."

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The rotary encoder 56R generates a pulse signal each time the output shaft of the electric motor 31R rotates for a predetermined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The control unit 50 carries out predetermined arithmetic processing by using the aforesaid measured values thereby to determine velocity commands, which are the desired values of the rotational angular velocities of the electric motors 31R and 31L, respectively, and carries out feedback control on the rotational angular velocity of each of the electric motors 31R and 31L according to the determined velocity commands.

Incidentally, the rotational angular velocity of the output shaft of the electric motor 31R and the rotational angular velocity of the rotating member 27R have a proportional relationship based on the speed reduction ratio of a fixed value between the output shaft and the rotating member 27R. Hence, for the sake of convenience, in the description of the present embodiment, the rotational angular velocity of the electric motor 31R may be used to express the rotational angular velocity of the rotating member 27R. Similarly, the rotational angular velocity of the electric motor 31L may be used to express the rotational angular velocity of the rotating member 27L.

The following will describe in more detail the control processing carried out by the control unit 50.

Figure 7:
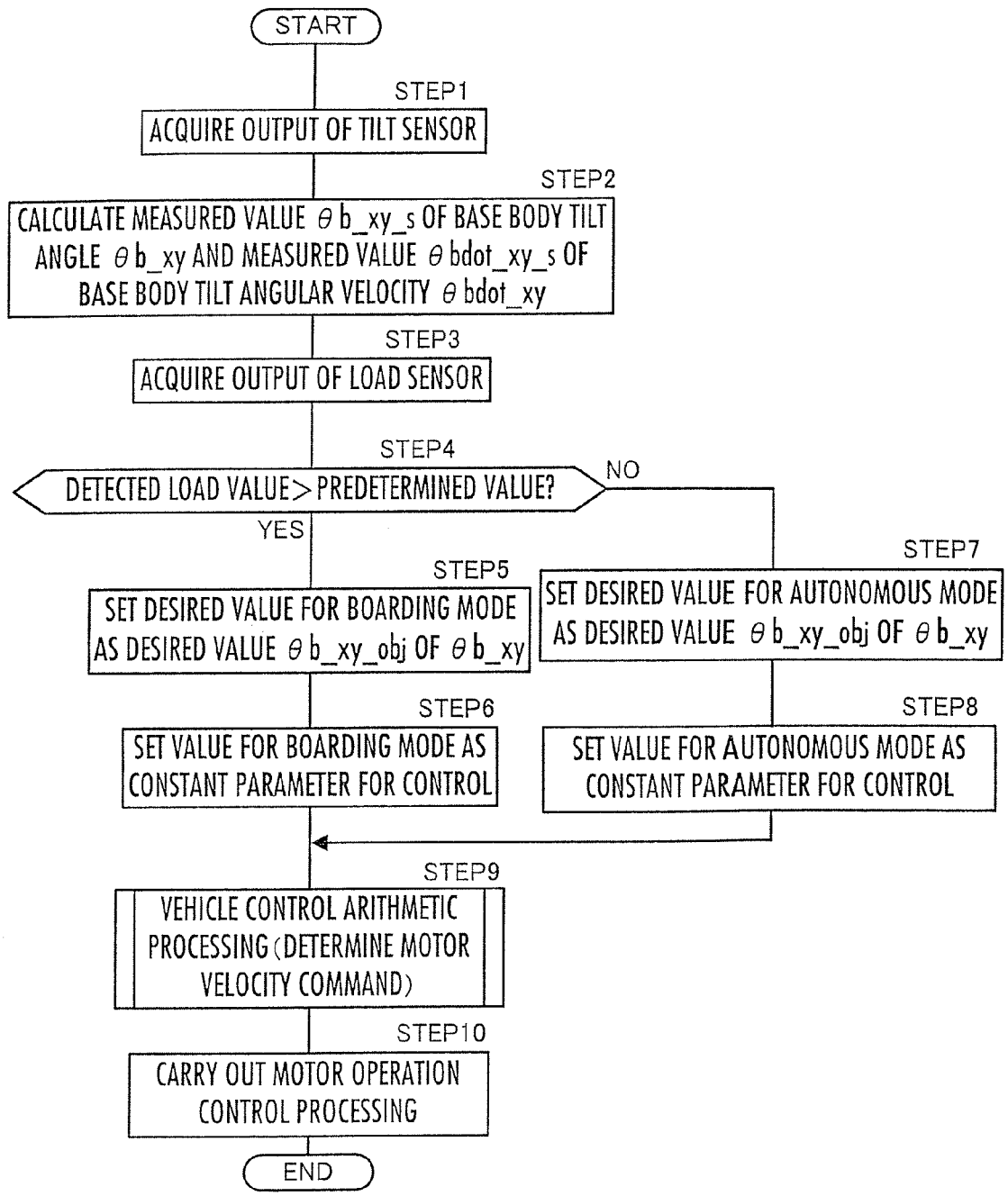
FIG. 7 is a flowchart illustrating the processing by a control unit of the inverted pendulum type vehicle according to the embodiment.

The control unit 50 executes the processing (main routine processing) illustrated by the flowchart of FIG. 7 at a predetermined control processing cycle.

First, in STEP1, the control unit 50 acquires an output of a tilt sensor 52.

Subsequently, the control unit 50 proceeds to STEP2 to calculate a measured value $\theta b\_xy\_s$ of a base body tilt angle $\theta b$ and a measured value $\theta bdot\_xy\_s$ of a base body tilt angular velocity $\theta bdot$ on the basis of the acquired output of the tilt sensor 52.

In the following description, to denote the observed value (the measured value or an estimated value) of an actual value of a variable (a state amount), such as the aforesaid measured value $\theta b\_xy\_s$, by a reference character, the reference character of the variable will have a suffix "_s".

Next, after acquiring an output of a load sensor 54 in STEP3, the control unit 50 carries out the determination processing in STEP4. In the determination processing, the control unit 50 determines whether or not the vehicle 1 has an occupant aboard (whether or not an occupant is sitting on the seat 3) by determining whether or not the load measured value indicated by the acquired output of the load sensor 54 is larger than a predetermined value which has been set beforehand.

Then, if the determination result in STEP4 is affirmative, then the control unit 50 carries out the processing for setting a desired value $\theta b\_xy\_obj$ of the base body tilt angle $\theta b$ and the processing for setting the values of constant parameters (e.g., the basic values of various gains) for controlling the operation of the vehicle 1 in STEP5 and STEP6, respectively.

In STEP5, the control unit 50 sets a predetermined desired value for a boarding mode as the desired value $\theta b\_xy\_obj$ of the base body tilt angle $\theta b$.

Here, the term "boarding mode" means the operation mode of the vehicle 1 in the case where the occupant is aboard the vehicle 1. The desired value $\theta b\_xy\_obj$ for the boarding mode is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5.

Further, in STEP6, the control unit 50 sets predetermined values for the boarding mode as the values of constant parameters for controlling the operation of the vehicle 1. The constant parameters include, for example, hx, hy, Ki_a_x, Ki_b_x, Ki_a_y, and Ki_b_y (i=1, 2, 3), which will be discussed later.

Meanwhile, if the determination result in STEP4 is negative, then the control unit 50 carries out the processing for setting a desired value $\theta b\_xy\_obj$ of a base body tilt angle $\theta b\_xy$ and the processing for setting the values of constant parameters for controlling the operation of the vehicle 1 in STEP7 and STEP8, respectively.

In STEP7, the control unit 50 sets a predetermined desired value for an autonomous mode as the desired value $\theta b\_xy\_obj$ of the base body tilt angle $\theta b$.

Here, the term "autonomous mode" means an operation mode of the vehicle 1 in the case where the occupant is not aboard the vehicle 1. The desired value $\theta b\_xy\_obj$ for the autonomous mode is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value $\theta b\_xy\_obj$ for the autonomous mode is generally different from the desired value $\theta b\_xy\_obj$ for the boarding mode.

Further, in STEP8, the control unit 50 sets predetermined values for the autonomous mode as the values of constant parameters for controlling the operation of the vehicle 1. The values of the constant parameters for the autonomous mode are different from the values of the constant parameters for the boarding mode.

The aforesaid values of the constant parameters are set to be different between the boarding mode and the autonomous mode, because the response characteristics of the operations of the vehicle 1 relative to control inputs are different from each other due to the differences in the height of the aforesaid center-of-gravity point, the overall mass, and the like between the respective modes.

By the processing in STEP4 to STEP8 described above, the desired value $\theta b\_xy\_obj$ of the base body tilt angle $\theta b\_xy$ and the values of the constant parameters are set for each of the operational modes, namely, the boarding mode and the autonomous mode.

Incidentally, the processing in STEP5 and STEP6 or the processing in STEP7 and STEP8 is not essential to carry out for each control processing cycle. Alternatively, the processing may be carried out only when the determination result in STEP4 changes.

Supplementally, in both the boarding mode and the autonomous mode, the desired value of a component $\theta bdot\_x$ in the direction about a Y-axis of the base body tilt angular velocity $\theta bdot$ and the desired value of a component $\theta bdot\_y$ in the direction about an X-axis thereof are both 0. For this reason, it is unnecessary to carry out the processing for setting a desired value of the base body tilt angular velocity $\theta bdot\_xy$.

After carrying out the processing in STEP5 and STEP6 or the processing in STEP7 and STEP8 as described above, the control unit 50 carries out vehicle control arithmetic processing in STEP9 thereby to determine the speed commands for electric motors 31R and 31L, respectively. The vehicle control arithmetic processing will be discussed later in detail.

Subsequently, the control unit 50 proceeds to STEP10 to carry out the processing for controlling the operations of the electric motors 31R and 31L according to the speed commands determined in STEP9. In this operation control processing, based on the difference between the speed command for the electric motor 31R determined in STEP9 and the measured value of the rotational speed of the electric motor 31R measured on the basis of an output of a rotary encoder 56R, the control unit 50 determines a desired value (desired torque) of an output torque of the electric motor 31R such that the difference is converged to 0. Then, the control unit 50 controls the current supplied to the electric motor 31R such that the electric motor 31R outputs an output torque of the desired torque. The same applies to the operation control of the left electric motor 31L.

The above has described the general control processing carried out by the control unit 50.

The vehicle control arithmetic processing in STEP9 mentioned above will now be described in detail.

In the following description, the vehicle-occupant overall center-of-gravity point in the boarding mode and the vehicle-alone center-of-gravity point in the autonomous mode will be generically referred to as the vehicle system center-of-gravity point. The vehicle system center-of-gravity point will mean the vehicle-occupant overall center-of-gravity point when the operational mode of the vehicle 1 is the boarding mode and will mean the vehicle-alone center-of-gravity point when the operational mode of the vehicle 1 is the autonomous mode.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value will mean a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 8:
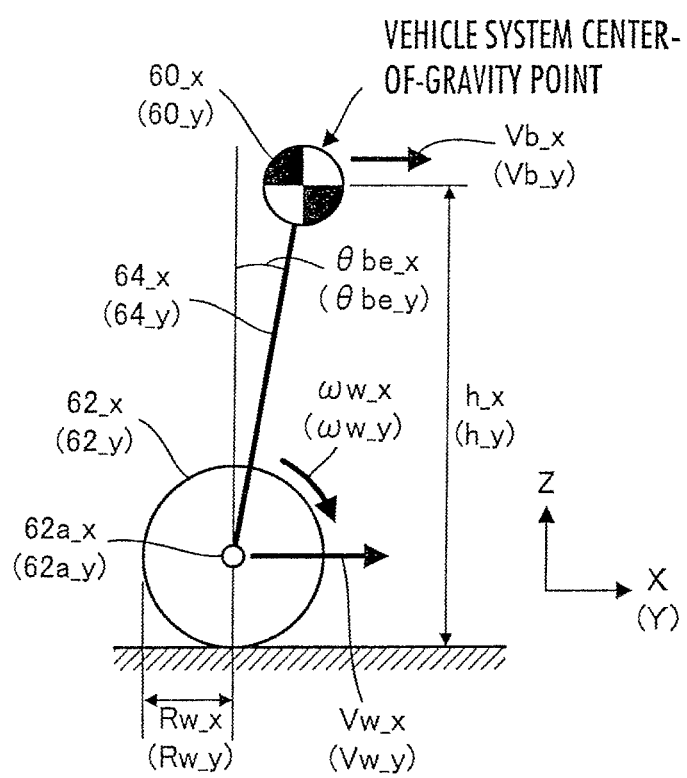
FIG. 8 is a diagram illustrating an inverted pendulum model expressing the dynamic behaviors of the inverted pendulum type vehicle according to the embodiment.

In the present embodiment, the vehicle control arithmetic processing in STEP9 is carried out, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 8.

In FIG. 8, unparenthesized reference numerals denote the reference numerals associated with the inverted pendulum model observed from the Y-axis direction, while the parenthesized reference numerals denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as the supporting point.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the parenthesized reference numerals in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predetermined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \qquad \text{Expression 01a}$$

$$\omega w\_y = C \cdot (\omega\_R - \omega\_L)/2 \qquad \text{Expression 01b}$$

where "C" in expression 01b denotes a coefficient of a predetermined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

Here, the dynamics of the inverted pendulum model shown in FIG. 8 is represented by expressions 03x and 03y given below. Expression 03x is an expression that represents the dynamics of the inverted pendulum model observed from the Y-axis direction, while expression 03y is an expression that represents the dynamics of the inverted pendulum model observed from the X-axis direction.

$$d^2\theta be\_x/dt^2 = \alpha\_x \cdot \theta be\_x + \beta\_x \cdot \omega wdot\_x \qquad \text{Expression 03x}$$

$$d^2\theta be\_y/dt^2 = \alpha\_y \cdot \theta be\_y + \beta\_y \cdot \omega wdot\_y \qquad \text{Expression 03y}$$

where ωwdot_x in expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in expression 03y.

As may be understood from these expressions 03x and 03y, the motions of the mass points 60_x and 60_y of the inverted pendulum (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic processing in STEP9, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x · ωw_x_cmd) and the moving velocity of the imaginary wheel 62_y corresponding to the imaginary wheel rotational angular velocity command ωw_y_cmd (=Rw_y · ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Supplementally, of the imaginary wheel rotational angular acceleration commands ωwdot_x_cmd, ωwdot_y_cmd as the manipulation variable (control input) in the present embodiment, ωwdot_x_cmd is a rotational angular acceleration of the virtual wheel 62_x traveling in the X-axis direction, so that the same functions as the manipulated variable for regulating the driving force to be applied to the wheel assembly 5 for moving the wheel assembly 5 in the X-axis direction. Further, ωwdot_y_cmd is a rotational angular acceleration of the virtual wheel 62_y traveling in the Y-axis direction, so that the same functions as the manipulated variable for regulating the driving force to be applied to the wheel assembly 5 for moving the wheel assembly 5 in the Y-axis direction.

Figure 9:
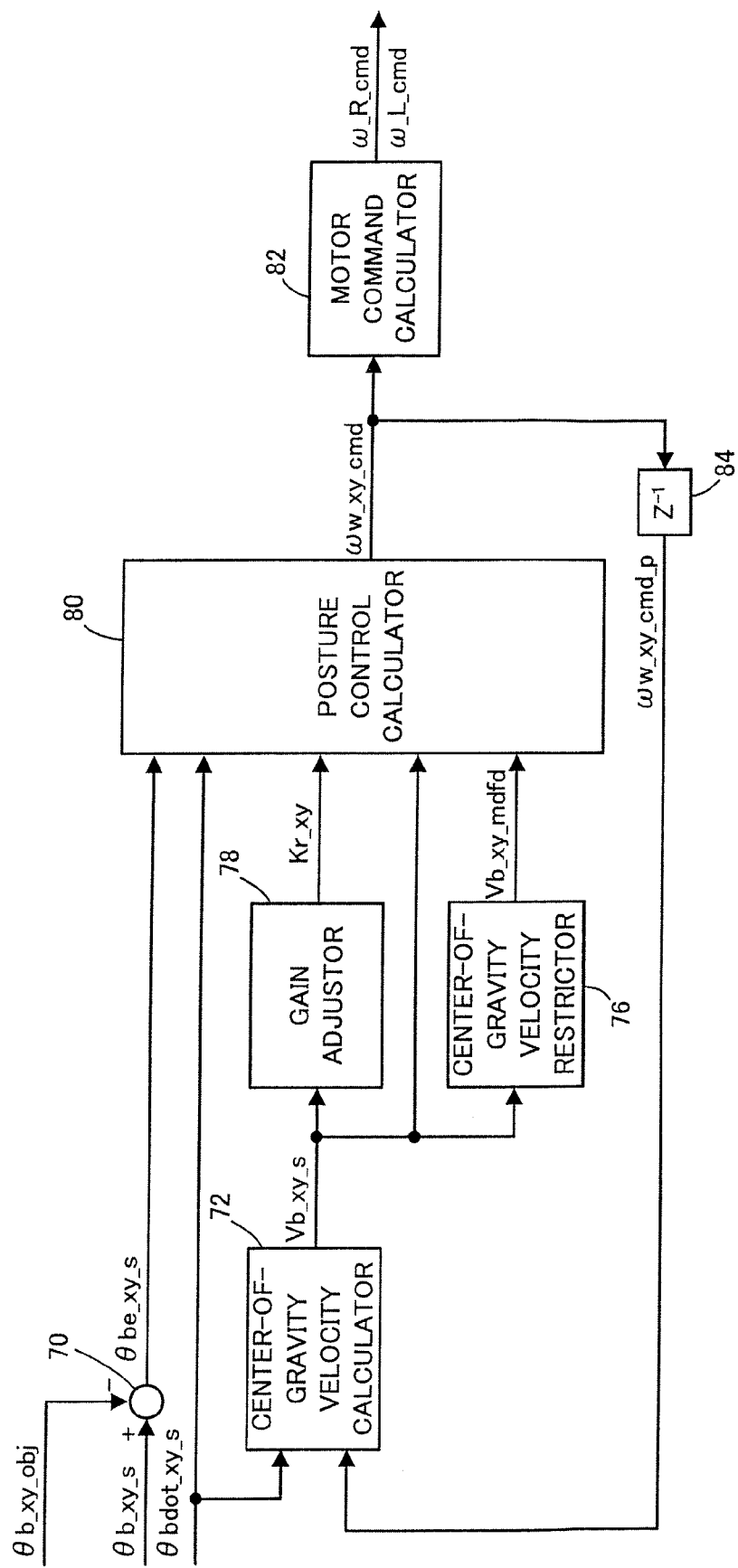
FIG. 9 is a block diagram illustrating a processing function related to the processing in STEP9 of FIG. 7.

The control unit 50 is provided with the functions illustrated in the block diagram of FIG. 9 as the functions for carrying out the vehicle control arithmetic processing in STEP9 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy, which is the moving velocity of the vehicle system center-of-gravity point, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L, and a gain adjustor 78 which determines a gain adjustment parameter Kr_xy for adjusting the values of the gain coefficients of expressions 07x and 07y, which will be discussed later.

The control unit 50 is further provided with a posture control calculator 80 which calculates the imaginary wheel rotational angular velocity command ωw_xy_cmd, and a motor command calculator 82 which converts the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Reference numeral 84 in FIG. 9 denotes a delay element which receives the imaginary wheel rotational angular velocity command ωw_xy_cmd calculated at each control processing cycle by the posture control calculator 80. The delay element 84 outputs a previous value ωw_xy_cmd_p of the imaginary wheel rotational angular velocity command ωw_xy_cmd at each control processing cycle.

In the vehicle control arithmetic processing in STEP9 described above, the processing by the aforesaid processing sections is carried out as described below.

The control unit 50 first carries out the processing by the error calculator 70 and the processing by the center-of-gravity velocity calculator 72.

The error calculator 70 receives the base body tilt angle measured values θb_xy_s (θb_x_s and θb_y_s) calculated in the aforesaid STEP2 and the desired values θb_xy_obj (θb_x_obj and θb_y_obj) set in the aforesaid STEP5 or STEP7. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The processing by the error calculator 70 may be carried out before the vehicle control arithmetic processing in STEP9. For example, the processing by the error calculator 70 may be carried out during the processing in the aforesaid STEP5 or STEP7.

The center-of-gravity velocity calculator 72 receives the current value of the base body tilt angular velocity measured values θbdot_xy_s (θbdot_x_s and θbdot_y_s) calculated in the aforesaid STEP2 and also receives the previous value ωw_xy_cmd_p of the imaginary wheel velocity command ωw_xy_cmd (ωw_x_cmd_p and ωw_y_cmd_p) from the delay element 84. Then, the center-of-gravity velocity calculator 72 calculates an estimated center-of-gravity velocity value Vb_xy_s (Vb_x_s and Vb_y_s) from the above input values according to a predetermined arithmetic expression based on the aforesaid inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \quad 05x$$

$$Vb\_y\_s = Rw\_y \cdot \omega w\_y\_cmd\_p + h\_y \cdot \theta bdot\_y\_s \quad 05y$$

In these expressions 05x and 05y, Rw_x and Rw_y denote the radii of the imaginary wheels 62_x and 62_y, respectively, as described above, and the values thereof are predetermined values set beforehand. Further, reference characters h_x and b_y denote the heights of the mass points 60_x and 60_y, respectively, of the inverted pendulum model. In this case, according to the present embodiment, the height of the vehicle system center-of-gravity point is maintained to be substantially constant. Thus, predetermined values set beforehand are used as the values of h_x and h_y, respectively. Supplementally, the heights h_x and h_y are included in the constant parameters for setting the values in the aforesaid STEP6 or STEP8.

The first term of the right side of expression 05x given above denotes the moving velocity of the imaginary wheel 62_x in the X-axis direction, which corresponds to the previous value ωw_x_cmd_p of the velocity command of the imaginary wheel 62_x. This moving velocity corresponds to the current value of an actual moving velocity of the wheel assembly 5 in the X-axis direction. Further, the second term of the right side of expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmd_p and ωw_y_cmd_p of expressions 05x and 05y. However, in order to eliminate the influences of noises contained in the measured values of the rotational angular velocities, it is advantageous to use ωw_x_cmd_p and ωw_y_cmd_p, which are desired values.

Subsequently, the control unit 50 carries out the processing by the center-of-gravity velocity restrictor 76 and the processing by the gain adjustor 78. In this case, the center-of-gravity velocity restrictor 76 and the gain adjustor 78 respectively receive the estimated center-of-gravity velocity values Vb_xy_s (Vb_x_s and Vb_y_s) calculated by the center-of-gravity velocity calculator 72 as described above.

Then, the gain adjustor 78 determines the gain adjustment parameters Kr_xy (Kr_x and Kr_y) on the basis of the input estimated center-of-gravity velocity values Vb_xy_s (Vb_x_s and Vb_y_s).

The processing by the gain adjustor 78 will be described below with reference to FIG. 10 and FIG. 11.

Figure 10:
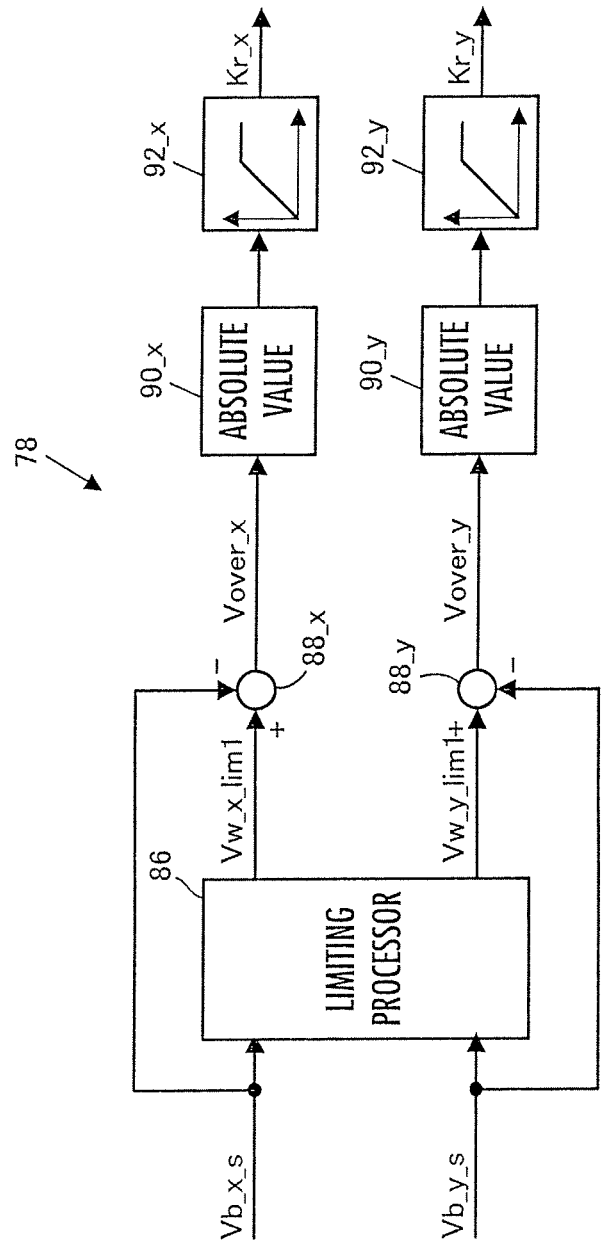
FIG. 10 is a block diagram illustrating a processing function of a gain adjusting element shown in FIG. 9.
Figure 11:
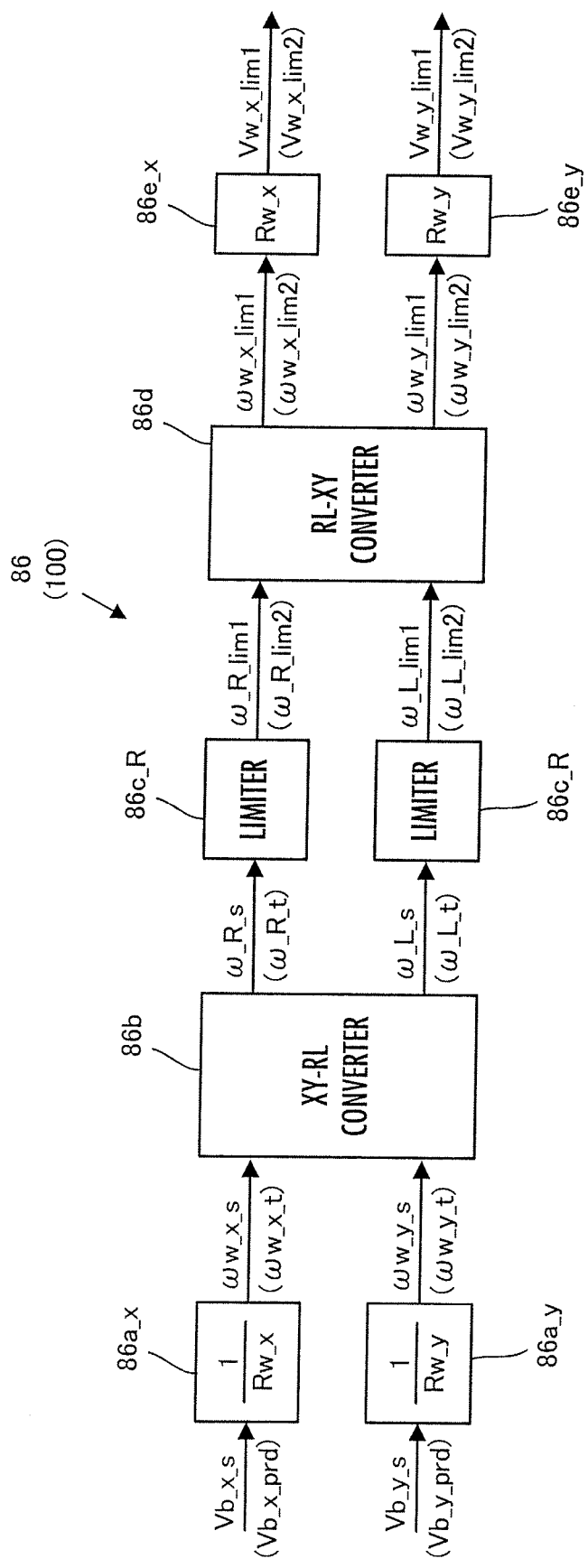
FIG. 11 is a block diagram illustrating a processing function of a limiting processor shown in FIG. 10 (or a limiting processor shown in FIG. 12)

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 means a value obtained after limiting the moving velocity Vw_x of the imaginary wheel 62_x in the X-axis direction and the output value Vw_y_lim1 means a value obtained after limiting the moving velocity Vw_y of the imaginary wheel 62_y in the Y-axis direction.

The processing by the limiting processor 86 will be described in further detail with reference to FIG. 11. The parenthesized reference characters in FIG. 11 denote the processing by a limiting processor 104 of the center-of-gravity velocity restrictor 76, which will be discussed later, and may be ignored in the description related to the processing by the limiting processor 86.

The limiting processor 86 first supplies the estimated center-of-gravity velocity values Vb_x_s and Vb_y_s to processors 86a_x and 86a_y, respectively. The processor 86a_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86a_y calculates the rotational angular velocity ωw_y_s of the imaginary wheel 62_y (=Vb_y_s/Rw_y) in the case where it is assumed that the moving velocity of the imaginary wheel 62_y in the Y-axis direction coincides with Vb_y_s.

Subsequently, the limiting processor 86 converts the pair of ωw_x_s and Ωω_y_s into a pair of the rotational angular velocity ω_R_s of the electric motor 31R and the rotational angular velocity ω_L_s of the electric motor 31L by an XY-RL converter 86b.

According to the present embodiment, the conversion is implemented by solving a simultaneous equation obtained by replacing ωw_x, ωw_y, ω_R and ω_L of the aforesaid expressions 01a and 01b by ωw_x_s, ωw_y_s, ω_R_s and ω_L_s, respectively, taking the ω_R_s and ω_L_s as unknowns.

Subsequently, the limit processor 86 supplies the output values ω_R_s and ω_L_s of the XY-RL converter 86b to limiters 86c_R and 86c_L, respectively. At this time, the limiter 86c_R directly outputs the ω_R_s as an output value ω_R_lim1 if the ω_R_s falls within the permissible range for the right motor, which has an upper limit value (>0) and a lower limit value (<0) of predetermined values set beforehand. If the ω_R_s deviates from the permissible range for the right motor, then the limiter 86c_R outputs, as the output value ω_R_lim1, a boundary value of the upper limit value or the lower limit value of the permissible range for the right motor whichever is closer to the ω_R_s. Thus, the output value ω_R_lim1 of the limiter 86c_R is limited to a value within the permissible range for the right motor.

Similarly, the limiter 86c_L directly outputs the ω_L_s as an output value ω_L_lim1 if the ω_L_s falls within the permissible range for the left motor, which has an upper limit value (>0) and a lower limit value (<0) of predetermined values set beforehand. If the ω_L_s deviates from the permissible range for the left motor, then the limiter 86c_L outputs, as the output value ω_L_lim1, a boundary value of the upper limit value or the lower limit value of the permissible range for the left motor whichever is closer to the ω_L_s. Thus, the output value ω_L_lim1 of the limiter 86c_L is limited to a value within the permissible range for the left motor.

The permissible range for the right motor described above is a permissible range which has been set so as to prevent the rotational angular velocity (absolute value) of the right electric motor 31R from becoming excessively high thereby to prevent the maximum value of the torque that can be output by the electric motor 31R from decreasing. This applies also to the permissible range for the left motor.

Subsequently, the limit processor 86 converts the pair of the output values ω_R_lim1 and ω_L_lim1 of the limiters 86c_R and 86c_L, respectively, into a pair of the rotational angular velocities ωw_x_lim1 and ωw_y_lim1 of the imaginary wheels 62_x and 62_y, respectively, by an RL-XY converter 86d.

The conversion is the processing of the inverse conversion of the processing of the conversion by the aforesaid XY-RL converter 86b. This processing is implemented by solving a simultaneous equation obtained by replacing ωw_x, ωw_y, ω_R and ω_L of the aforesaid expressions 01a and 01b by ωw_x_lim1, ωw_y_lim1, ω_R_lim1 and ω_L_lim1, respectively, taking the ωw_x_lim1 and ωw_y_lim1 as unknowns.

Subsequently, the limit processor 86 supplies the output values ωw_x_lim1 and ωw_y_lim1 of the RL-XY converter 86d to processors 86e_x and 86e_y, respectively. The processor 86e_x multiplies ωw_x_lim1 by the radius Rw_x of the imaginary wheel 62_x to convert ωw_x_lim1 into the moving velocity Vw_x_lim1 of the imaginary wheel 62_x. In the same manner, the processor 86e_y converts ωw_y_lim1 into the moving velocity Vw_y_lim1 of the imaginary wheel 62_y (=ωw_y_lim1·Rw_y).

If it is assumed that the processing by the limiting processor 86 described above causes the moving velocity Vw_x of the imaginary wheel 62_x in the X-axis direction and the moving velocity Vw_y of the imaginary wheel 62_y in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 10, the gain adjustor 78 then carries out the processing by calculators 88_x and 88_y. The calculator 88_x receives the estimated center-of-gravity velocity value in the X-axis direction Vb_x_s and the output value Vw_x_lim1 of the limiting processor 86. Then, the calculator 88_x calculates a value Vover_x obtained by subtracting Vb_x_s from Vw_x_lim1 and outputs the value Vover_x. Further, the calculator 88_y receives the estimated center-of-gravity velocity value in the Y-axis direction Vb_y_s and the output value Vw_y_lim1 of the limiting processor 86. Then, the calculator 88_y calculates a value Vover_y obtained by subtracting Vb_y_s from Vw_y_lim1 and outputs the value Vover_y.

In this case, if the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_x and 88_y, respectively, will be both 0.

Meanwhile, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1–Vb_x_s) and a corrected amount from Vb_y_s of Vw_y_lim1 (=Vw_y_lim1–Vb_y_s) will be output from the calculators 88_x and 88_y, respectively.

Subsequently, the gain adjustor 78 passes the output value Vover_x of the calculator 88_x through processors 90_x and 92_x in this order thereby to determine the gain adjustment parameter Kr_x. Further, the gain adjustor 78 passes the output value Vover_y of the calculator 88_y through processors 90_y and 92_y in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic is a characteristic in which a change amount of an output value relative to an increase in an input value becomes 0 or approaches to 0 when the input value increases to a certain level.

In this case, according to the present embodiment, if the input value |Vover_x| is a preset, predetermined value or less, then the processor 92_x outputs, as Kr_x, a value obtained by multiplying the input value |Vover_x| by a proportionality coefficient of a predetermined value. Further, if the input value |Vover_x| is larger than the predetermined value, then the processor 92_x outputs 1 as Kr_x. Incidentally, the proportionality coefficient is set such that the product of

|Vover_x| and the proportionality coefficient becomes 1 when |Vover_x| agrees with a predetermined value.

The processing by processors $90\_y$ and $92\_y$ is the same as that carried out by the processors $90\_x$ and $92\_x$, respectively, described above.

If the output values Vw_x_lim1 and Vw_y_lim1 in the limiting processor 86 are not forcibly restricted by the processing carried out by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the gain adjustment parameters Kr_x and Kr_y are both determined to be 0. Therefore, generally, Kr_x=Kr_y=0.

Meanwhile, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the gain adjustment parameters Kr_x and Kr_y are determined on the basis of the absolute values of the aforesaid corrected amounts Vover_x and Vover_y, respectively. In this case, Kr_x is determined to be a larger value as the absolute value of the corrected amount Vover_x increases, the upper limit value thereof being 1. The same applies to Kr_y.

Figure 12:
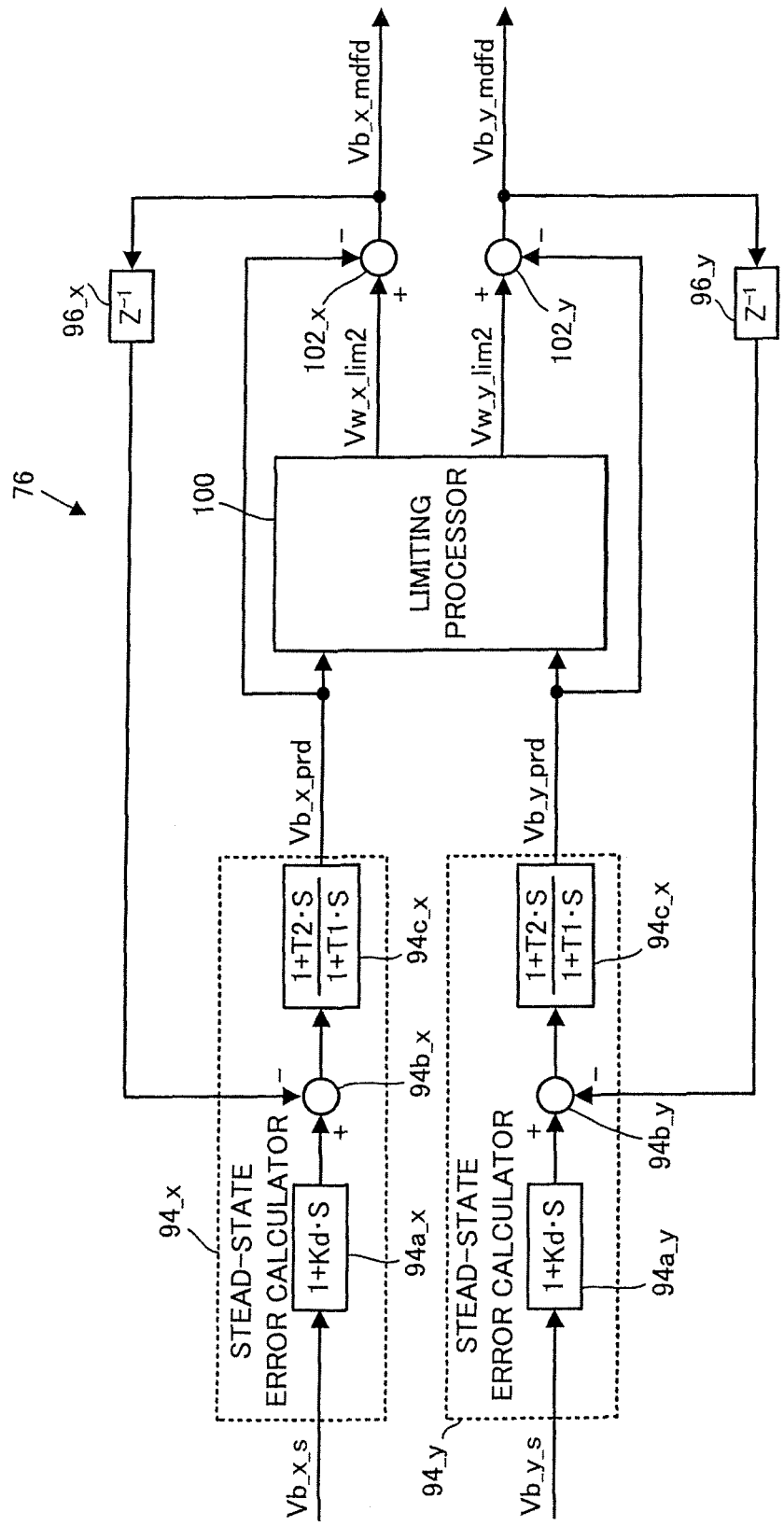
FIG. 12 is a block diagram illustrating a processing function of a center-of-gravity velocity restrictor 76 shown in FIG. 9.

The center-of-gravity velocity restrictor 76 carries out the processing illustrated by the block diagram of FIG. 12 by using the estimated center-of-gravity velocity values Vb_xy_s (Vb_x_s and Vb_y_s) input thereto so as to determine desired center-of-gravity velocities for control Vb_xy_mdfd (Vb_x_mdfd and Vb_y_mdfd).

To be more specific, the center-of-gravity velocity restrictor 76 first carries out the processing by stead-state error calculators $94\_x$ and $94\_y$.

In this case, the stead-state error calculator $94\_x$ receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element $96\_x$. Then, in the stead-state error calculator $94\_x$, first, the input Vb_x_s is supplied to a proportional-differential compensation component (PD compensation component) $94a\_x$. The proportional-differential compensation component $94a\_x$ is a compensation component whose transfer function is denoted by $1+Kd\cdot S$, and adds the input Vb_x_s and the value obtained by multiplying the differential value thereof (temporal change rate) by a coefficient Kd of a predetermined value, and outputs the value resulting from the addition.

Subsequently, the stead-state error calculator $94\_x$ calculates, by a calculator $94b\_x$, the value obtained by subtracting the input Vb_x_mdfd_p from the output value of the proportional-differential compensation component $94a\_x$, then supplies the output value of the calculator $94b\_x$ to a low-pass filter $94c\_x$ having a phase compensation function. The low-pass filter $94c\_x$ is a filter whose transfer function is denoted by $(1+T2\cdot S)/(1+T1\cdot S)$. Then, the stead-state error calculator $94\_x$ outputs the output value Vb_x_prd of the low-pass filter $94c\_x$.

Further, the stead-state error calculator $94\_y$ receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element $96\_y$.

Then, as with the stead-state error calculator $94\_x$ described above, the stead-state error calculator $94\_y$ carries out the processing by a proportional-differential compensation component $94a\_y$, a calculator $94b\_y$, and a low-pass filter $94c\_y$ in order and outputs an output value Vb_y_prd of the low-pass filter $94c\_y$.

Here, the output value Vb_x_prd of the stead-state error calculator $94\_x$ has a meaning as a stead-state error of a future estimated center-of-gravity velocity value in the X-axis direction presumed from a current motion state of the vehicle system center-of-gravity point observed from the Y-axis direction (in other words, the motion state of the mass point $60\_x$ of the inverted pendulum model observed from the Y-axis direction) relative to the desired center-of-gravity velocity for control Vb_x_mdfd of an expected convergence value. Similarly, the output value Vb_y_prd of the stead-state error calculator $94\_y$ has a meaning as a stead-state error of a future estimated center-of-gravity velocity value in the Y-axis direction presumed from a current motion state of the vehicle system center-of-gravity point observed from the X-axis direction (in other words, the motion state of the mass point $60\_y$ of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators $94\_x$ and $94\_y$, respectively, will be referred to as the expected center-of-gravity velocity stead-state error values.

After carrying out the processing by the stead-state error calculators $94\_x$ and $94\_y$ as described above, the center-of-gravity velocity restrictor 76 inputs the expected center-of-gravity velocity stead-state error values Vb_x_prd, Vb_y_prd, respectively, to a limiting processor 100. The processing by the limiting processor 100 is the same as the processing by the limiting processor 86 of the gain adjustor 78 described above. In this case, as indicated by the parenthesized reference characters in FIG. 11, only the input values and the output values of the individual processing sections of the limiting processor 100 are different from those of the limiting processor 86.

To be more specific, in the limiting processor 100, rotational angular velocities ωw_x_t and ωw_y_t of the imaginary wheels $62\_x$ and $62\_y$ in the case where it is assumed that the moving velocities Vw_x and Vw_y of the imaginary wheels $62\_x$ and $62\_y$, respectively, coincide with Vb_x_prd and Vb_y_prd, respectively, are calculated by the processors $86a\_x$ and $86a\_y$, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Further, these rotational angular velocities ω_R_t and ω_L_t are limited to values within the permissible range for the right motor and the permissible range for the left motor, respectively, by limiters $86c\_R$ and $86c\_L$. Then, the values ω_R_lim2 and ω_L_lim2, which have been subjected to the limitation processing, are converted by the RL-XY converter 86*d* into the rotational angular velocities ωw_x_lim2 and ωw_y_lim2 of the imaginary wheels 62_*x* and 62_*y*.

Subsequently, the moving velocities Vw_x_lim2 and Vw_y_lim2 of the imaginary wheels 62_*x* and 62_*y* corresponding to the rotational angular velocities ωw_x_lim2 and ωw_y_lim2 are calculated by the processors 86*e*_x and 86*e*_y, respectively, and these moving velocities Vw_x_lim2 and Vw_y_lim2 are output from the limiting processor 100.

By carrying out the processing by the limiting processor 100 described above, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges, as with the limiting processor 86.

Incidentally, the permissible ranges for the right motor and left motor in the limiting processor 100 do not have to be the same as the permissible ranges in the limiting processor 86, and may be set to be permissible ranges that are different from each other.

Referring back to the description of FIG. 12, the center-of-gravity velocity restrictor 76 then carries out the processing by calculators 102_*x* and 102_*y* to calculate the desired center-of-gravity velocities for control Vb_x_mdfd and Vb_y_mdfd, respectively. In this case, the calculator 102_*x* calculates a value, which is obtained by subtracting the expected center-of-gravity velocity stead-state error value in the X-axis direction Vb_x_prd from the output value Vw_x_lim2 of the limiting processor 100, as the desired center-of-gravity velocity for control in the X-axis direction Vb_x_mdfd. Similarly, the calculator 102_*y* calculates a value, which is obtained by subtracting the expected center-of-gravity velocity stead-state error value in the Y-axis direction Vb_y_prd from the output value Vw_y_lim2 of the limiting processor 100, as the desired center-of-gravity velocity for control in the Y-axis direction Vb_y_mdfd.

Regarding the desired center-of-gravity velocities for control Vb_x_mdfd and Vb_y_mdfd determined as described above, in the case where the output values Vw_x_lim2 and Vw_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the expected center-of-gravity velocity stead-state error values Vb_x_prd, Vb_y_prd, respectively, then the desired center-of-gravity velocities for control Vb_x_mdfd, Vb_y_mdfd are set to 0, respectively. Therefore, generally, Vb_x_mdfd=Vb_y_mdfd=0.

Meanwhile, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the expected center-of-gravity velocity stead-state error values Vb_x_prd, Vb_y_prd, respectively, then for the X-axis direction, a correction amount from the input value Vb_x_prd of the output value Vw_x_lim2 of the limiting processor 100 (=Vw_x_lim2−Vb_x_prd) is determined as the desired center-of-gravity velocity for control in the X-axis direction Vb_x_mdfd.

Further, regarding the Y-axis direction, a correction amount from the input value Vb_y_prd of the output value Vw_y_lim2 of the limiting processor 100 (=Vw_y_lim2−Vb_y_prd) is determined as the desired center-of-gravity velocity for control in the Y-axis direction Vb_y_mdfd.

In this case, for example, for the velocity in the X-axis direction, the desired center-of-gravity velocity for control Vb_x_mdfd becomes a velocity in the opposite direction from the expected center-of-gravity velocity stead-state error value in the X-axis direction Vb_x_prd output by the steadstate error calculator 94_*x*. The same applies to the velocity in the Y-axis direction.

The above has described the processing by the center-of-gravity velocity restrictor 76.

Returning to the description of FIG. 9, after carrying out the processing by the center-of-gravity velocity restrictor 76, the gain adjustor 78, and the error calculator 70 as described above, the control unit 50 carries out the processing by the posture control calculator 80.

Figure 13:
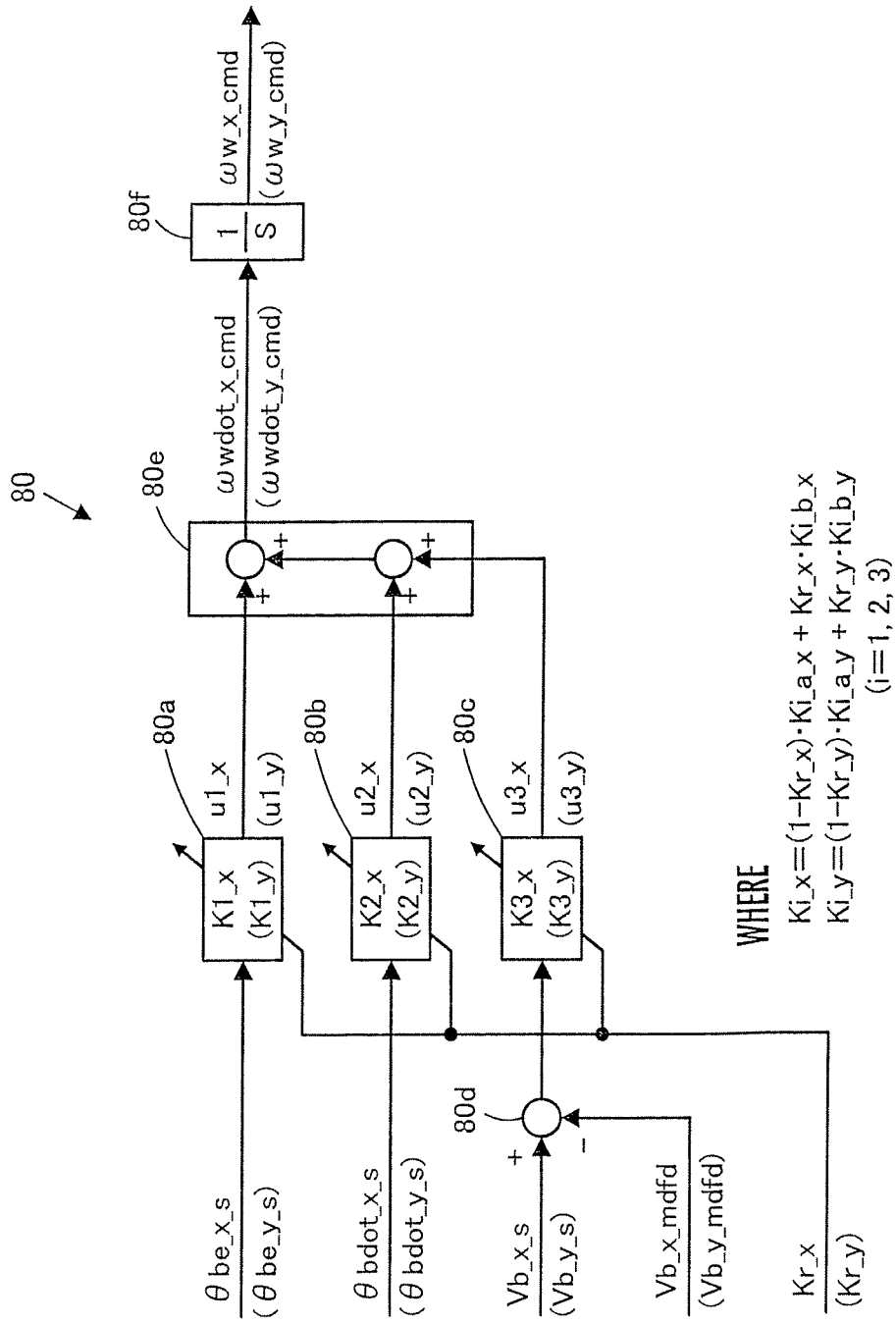
FIG. 13 is a block diagram illustrating a processing function of a posture control calculator 80 shown in FIG. 9.

The processing by the posture control calculator 80 will be described below by referring to FIG. 13. Incidentally, the unparenthesized reference characters in FIG. 13 are the reference characters related to the processing for determining the aforesaid imaginary wheel rotational angular velocity command ωw_x_cmd, which is the desired value of the rotational angular velocity of the imaginary wheel 62_*x* circumrotating in the X-axis direction. The parenthesized reference characters are the reference characters related to the processing for determining the aforesaid imaginary wheel rotational angular velocity command ωw_y_cmd, which is the desired value of the rotational angular velocity of the imaginary wheel 62_*y* circumrotating in the Y-axis direction.

The posture control calculator 80 receives the base body tilt angle error measured value θbe_xy_s calculated by the error calculator 70, the base body tilt angular velocity measured values θbdot_xy_s calculated in the aforesaid STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωwdot_xy_cmd according to the following expressions 07x and 07y by using the above received values.

ωwdot_*x*_cmd=K1_*x*·θbe_*x*_s+K2_*x*·θbdot_*x*_s+
   K3_*x*·(Vb_*x*_s−Vb_*x*_mdfd)            Expression 07x ωwdot_*y*_cmd=K1_*y*·θbe_*y*_s+K2_*y*·θbdot_
   *y*_s+K3_*y*·(Vb_*y*_s−Vb_*y*_mdfd)        Expression 07y Hence, according to the present embodiment, each imaginary wheel rotational angular acceleration command ωwdot_x_cmd denoting the manipulated variable (control input) for controlling the motion of the mass point 60_*x* of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_*y* of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

The gain coefficients K1_x and K1_y in these expressions 07x and 07y mean the feedback gains related to the tilt angle of the base body 9 (or the seat 3), the gain coefficients K2_x and K2_y mean the feedback gains related to the tilt angular velocity (the temporal change rate of a tilt angle) of the base body 9 (or the seat 3), and the gain coefficients K3_x and K3_y mean the feedback gains related to the moving velocity of the vehicle system center-of-gravity point (a predetermined representative point of the vehicle 1).

In this case, the gain coefficients K1_x, K2_x, and K3_x related to the manipulated variable components in expression 07x are variably set on the basis of the gain adjustment parameter Kr_x, while the gain coefficients K1_y, K2_y, and K3_y related to the manipulated variable components in expression 07y are variably set on the basis of the gain adjustment parameter Kr_y. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in expression 07x and an i-th gain coefficient Ki_y (i=1, 2, or 3) in expression 07y are determined on the basis of the gain adjustment parameters Kr_x and Kr_y according to expressions 09x and 09y given below, as indicated by the note in FIG. 13.

$$Ki\_x=(1-Kr\_x)\cdot Ki\_a\_x+Kr\_x\cdot Ki\_b\_x \quad \text{Expression 09x}$$

$$Ki\_y=(1-Kr\_y)\cdot Ki\_a\_y+Kr\_y\cdot Ki\_b\_y \quad \text{Expression 09y}$$

(i=1, 2, 3)

Here, Ki_a_x and Ki_b_x in expression 09x denote constant values set beforehand as the gain coefficient values on a minimum end (an end close to 0) of the i-th gain coefficient Ki_x and as the gain coefficient value on a maximum end (an end away from 0), respectively. The same applies to Ki_a_y and Ki_b_y in expression 09y.

Thus, each i-th gain coefficient Ki_x (i=1, 2 or 3) used in the calculation of expression 07x is determined as a weighted mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches 1 from 0, the i-th gain coefficient Ki_x approaches Ki_b_x from Ki_a_x.

Similarly, each i-th gain coefficient Ki_y (i=1, 2 or 3) used in the calculation of expression 07y is determined as a weighted mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

As explained earlier, Kr_x, Kr_y are generally (more specifically, in the case where the output values Vw_x_lim1, Vw_y_lim1 at the limiting processor 86 of the gain adjustor 78 are not forcibly restricted), 0. Therefore, the i-th gain coefficients Ki_x, Ki_y (i=1, 2, 3) generally become Ki_x=Ki_a_x, Ki_y=Ki_a_y.

Supplementally, the aforesaid constant values Ki_a_x, Ki_b_x and Ki_a_y, Ki_b_y (i=1, 2 or 3) are included in the constant parameters, the values of which are set in the aforesaid STEP6 or STEP8.

Further, in the present embodiment, in the state where Kr_x=0 and Kr_y=0 holds, the ratio with respect to the absolute value of first gain coefficient K1_x with respect to the absolute value of the third gain coefficient K3_x related to the expression 07x and the ratio with respect to the absolute values of the first gain coefficient K1_y with respect to the absolute value of the third gain coefficient K3_y related to the expression 07y differs between the boarding mode and the autonomous mode. This will be explained in detail later.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More detailedly, referring to FIG. 13, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80*a* and 80*b*, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80*d*, and calculates, by a processor 80*c*, a manipulated variable component u3_x obtained by multiplying the calculated difference by the third gain coefficient K3_x. Then, the posture control calculator 80 adds up these manipulated variable components u1_x, u2_x, and u3_x by a calculator 80*e* so as to calculate the imaginary wheel rotational angular acceleration command ωwdot_x_cmd.

Similarly, the posture control calculator 80 carries out the calculation of the above expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

In this case, the posture control calculator 80 calculates a manipulated variable component u1_y obtained by multiplying the base body tilt angle error measured value θbe_y_s by the first gain coefficient K1_y and a manipulated variable component u2_y obtained by multiplying the base body tilt angular velocity measured value θbdot_y_s by the second gain coefficient K2_y by the processors 80*a* and 80*b*, respectively. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) by the calculator 80*d*, and calculates, by the processor 80*c*, a manipulated variable component u3_y obtained by multiplying the calculated difference by the third gain coefficient K3_y. Then, the posture control calculator 80 adds up these manipulated variable components u1_y, u2_y, and u3_y by the calculator 80*e* so as to calculate the imaginary wheel rotational angular acceleration command ωwdot_x_cmd.

Here, the first term (=the first manipulated variable component u1_x) and the second term (=the second manipulated variable component u2_x) of the right side of expression 07x mean the feedback manipulated variable components for converging the base body tilt angle error measured value θbe_x_s in the direction about the X-axis to 0 (converging the base body tilt angle measured value θb_x_s to the desired value θb_x_obj) by the PD law (proportional-differential law) serving as the feedback control law.

Further, the third term (=the third manipulated variable component u3__x) of the right side of expression 07x means a feedback manipulated variable component for converging the difference between the estimated center-of-gravity velocity value Vb_x_s and the desired center-of-gravity velocity for control Vb_x_mdfd to 0 (converging Vb_x_s to Vb_x_mdfd) by a proportional law serving as the feedback control law.

The same applies to the first to the third terms (the first to the third manipulated variable components u1__y, u2__y, and u3__y) of the right side of expression 07y.

As is explained earlier, the desired center-of-gravity velocities for control Vb_x_mdfd, Vb_y_mdfd are generally (more specifically, in the case where the output values Vw_x_lim2, Vw_y_lim2 at the limiting processor 100 of the center-of-gravity velocity restrictor 76 are not forcibly restricted), 0. Further, in the general case where Vb_x_mdfd=Vb_y_mdfd=0, the third manipulated variable components u3__x, u3__y coincide with the value obtained by multiplying the estimated center-of-gravity velocity values Vb_x_s, Vb_y_s with the third gain coefficients K3__x, K3__y, respectively.

After calculating the imaginary wheel rotational angular acceleration commands ωwdot_x_cmd and ωwdot_y_cmd as described above, the posture control calculator 80 integrates each of the ωwdot_x_cmd and ωwdot_y_cmd by an integrator 80f thereby to determine the aforesaid imaginary wheel rotational velocity commands ωw_x_cmd and ωw_y_cmd.

The above has described the details of the processing by the posture control calculator 80.

Supplementally, the imaginary wheel rotational angular acceleration command ωwdot_x_cmd may alternatively be calculated by an expression wherein the third term of the right side of expression 07x is separated into the manipulated variable component based on Vb_x_s(=K3_x·Vb_x_s) and the manipulated variable component based on Vb_x_mdfd (=−K3_x·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωw_x_cmd and ωw_y_cmd of the imaginary wheels 62__x and 62__y have been used as the manipulated variables (control inputs) for controlling the behaviors of the vehicle system center-of-gravity point. However, for example, the drive torques of the imaginary wheels 62__x and 62__y or the translational forces obtained by dividing the driving torques by the radii Rw_x and Rw_y of each imaginary wheels 62__x and 62__y (i.e., the frictional forces between the imaginary wheels 62__x, 62__y and a floor surface) may be used as the manipulated variables.

Returning to the description of FIG. 9, the control unit 50 then supplies the imaginary wheel rotational velocity commands ωw_x_cmd and ωw_y_cmd determined as described above by the posture control calculator 80 to the motor command calculator 82, and carries out the processing by the motor command calculator 82 so as to determine a velocity command ω_R_cmd of the electric motor 31R and a velocity command ω_L_cmd of the electric motor 31L. The processing by the motor command calculator 82 is the same as the processing by the XY-RL converter 86b of the aforesaid limiting processor 86 (refer to FIG. 11).

To be more specific, the motor command calculator 82 determines the velocity commands ω_R_cmd and ω_L_cmd of the electric motors 31R and 31L by a simultaneous equation obtained by replacing ωw_x, ωw_y, ω_R and ω_L of the aforesaid expressions 01a and 01b by ωw_x_cmd, ωw_y_cmd, ω_R_cmd and ω_L_cmd, respectively, taking the ω_R_cmd and ω_L_cmd as unknowns.

Thus, the vehicle control arithmetic processing in the aforesaid STEP9 is completed.

By the control arithmetic processing carried out by the control unit 50 as described above, the imaginary wheel rotational angular acceleration commands ωwdot_xy_cmd as the manipulated variables (control inputs) are determined such that the vehicle system center-of-gravity is stationary, in the state where, basically, the posture of the sheet 3 and the base body 9 is maintained at a posture in which the aforesaid base body tilt angle error measured values θbe_x_s, θbe_y_s, are both 0 (hereinafter, this posture will be referred to as the basic posture). Further, by tilting the posture of the sheet 3 and the base body 9 with respect to the basic posture, stated otherwise, by displacing the horizontal direction position of the vehicle system center-of-gravity point (the vehicle-occupant overall center-of-gravity point or the vehicle-alone center-of-gravity point) from the state positioned approximately immediately above the ground contact surface of the wheel assembly 5, the imaginary wheel rotational angular acceleration commands ωwdot_xy_cmd are determined so that the posture of the sheet 3 and the base body 9 are restored to the basic posture (so as to bring θbe_x_s, θbe_y_s close to 0 or retain the same at 0).

Then, the rotational angular velocities of the electric motors 31R and 31L, respectively, obtained by converting the imaginary wheel rotational angular velocity commands ωw_xy_cmd, which is obtained by integrating each component of ωwdot_xy_cmd, are determined as the velocity commands ω_R_cmd and ω_L_cmd of the electric motors 31R and 31L. Further, the rotational velocities of the electric motors 31R and 31L are controlled according to the velocity commands ω_R_cmd and ω_L_cmd. Thus, the moving velocities of the wheel assembly 5 in the X-axis direction and the Y-axis direction, respectively, are controlled so as to agree with the moving velocity of the imaginary wheel 62__x corresponding to ωw_x_cmd and the moving velocity of the imaginary wheel 62__y corresponding to ωw_y_cmd, respectively.

With this arrangement, if, for example, the actual base body tilt angle θb_x deviates from the desired value θb_x_obj in the direction about the Y-axis by leaning forward, then the wheel assembly 5 moves forward to eliminate the deviation (to converge θbe_x_s to 0). Similarly, if the actual θb_x deviates from the desired value θb_x_obj by leaning backward, then the wheel assembly 5 moves backward to eliminate the deviation (to converge θbe_x_s to 0).

Further, for example, if the actual base body tilt angle θb_y deviates from the desired value θb_y_obj in the direction about the X-axis by leaning rightward, then the wheel assembly 5 moves rightward to eliminate the deviation (to converge θbe_y_s to 0). Similarly, if the actual θb_y deviates from the desired value θb_y_obj by leaning leftward, then the wheel assembly 5 moves leftward to eliminate the deviation (to converge θbe_y_s to 0).

Further, if both the actual base body tilt angles θb_x and θb_y deviate from the desired values θb_x_obj and θb_y_obj, respectively, then the moving operation of the wheel assembly 5 in the fore-and-aft direction to eliminate the deviation of θb_x and the moving operation of the wheel assembly 5 in the lateral direction to eliminate the deviation of θb_y are combined, so that the wheel assembly 5 will move in a direction combining the X-axis direction and the Y-axis direction (a direction at an angle to both the X-axis direction and the Y-axis direction).

Thus, if the sheet 3 and the base body 9 tilt from the basic posture, then the wheel assembly 5 moves toward the tilting side. Hence, if, for example, the occupant intentionally inclines his/her upper body together with the sheet 3 and the base body 9 in the aforesaid boarding mode, then the wheel assembly 5 will move to the tilting side. In the present embodiment, the moving direction of the vehicle system center-of-gravity point within the horizontal surface in the case where the sheet 3 and the base body 9 are tilted from the basic posture (moving direction in the direction orthogonal to the Z-axis) does not necessarily coincide with the moving direction of the wheel assembly 5, from the reasons to be explained later.

Then, during movement of the wheel assembly 5 (during movement of the overall vehicle 1), when the posture of the sheet 3 and the base body 9 are maintained at a constant posture tilted from the basic posture (a posture where the base body tilt angle error measured values θbe_xy_s become stable), the moving velocity of the vehicle system center-of-gravity point (and further the moving velocity of the wheel assembly 5) converges to the moving velocity having a constant error with the desired center-of-gravity velocities for control Vb_xy_mdfd, the error of which depends on the base body tilt angle error measured values θbe_xy_s.

In the present embodiment, in the general case where the traveling motion of the wheel assembly 5 is carried out at a traveling speed in which the rotational angular velocities of the electric motors 31R, 31L do not become excessively fast (more specifically, in the case where the forcible restriction of the output values Vw_x_lim2, Vw_y_lim2 of the limiting processor 100 of the center-of-gravity velocity restrictor 76 is not performed), the desired center-of-gravity velocities for control Vb_x_mdfd, Vb_x_mdfd Vb_y_mdfd are maintained at 0, respectively. When the posture of the sheet 3 and the base body 9 are maintained at a constant posture tilted from the basic posture, in the situation where Vb_x_mdfd, Vb_y_mdfd are maintained constant, the moving velocity of the vehicle system center-of-gravity point (and further the moving velocity of the wheel assembly 5) converges to the moving speed having magnitude and orientation depending on the base body tilt angle error measured value θbe_xy_s.

More detailed explanation will be given on such operation. In the stationary state where both of the base body tilt angle error measured values θbe_x_s, θbe_y_s are maintained constant, the second manipulated variable components u2_x, u2_y are 0. Therefore, the imaginary wheel rotational angular acceleration command ωwdot_x_cmd becomes a value in which the first manipulated variable component u1_x and the third manipulated variable component u3_x are added together, and the imaginary wheel rotational angular acceleration command ωwdot_y_cmd becomes a value in which the first manipulated variable component u1_y and the third manipulated variable component u3_y are added together.

And, in the stationary state, the imaginary wheel rotational angular acceleration commands ωwdot_x_cmd, ωwdot_x_cmd converge to a value capable of maintaining the moving velocity of the wheel assembly 5 constant. And consequently, the center-of-gravity velocities Vb_x, Vb_y converge to a contant value.

In this case, the second term on the right side of the expression 07x (=u2_x) becomes 0, the first term of the right side (=u1_x=K1_x·θbe_x_s) becomes a constant value, and ωwdot_x_cmd of the left side becomes a constant value, so that the converging value of the center-of-gravity velocity Vb_x in the X-axis direction (the converging value of the estimated center-of-gravity velocity value Vb_x_s. Hereinafter referred to as a stationary-state converging velocity Vb_x_stb) becomes a value depending on the base body tilt angle error measured value θbe_x_s about the Y-axis direction. More specifically, Vb_x_stb becomes Vb_x_stb=(−K1_x·Δθbe_x_s+ωwdot_x_cmd)/K3_x+Vb_x_mdfd, so that it becomes a function value which changes monotonously with respect to θbe_x_s.

Similarly, the second term on the right side of the expression 07y (=u2_y) becomes 0, the first term on the right side (=u1_y=K1_y·θbe_y_s) becomes a constant value, and ωwdot_y_cmd on the left side becomes a constant value, so that the converging value of the center-of-gravity velocity Vb_y in the Y-axis direction (the converging value of the estimated center-of-gravity velocity value Vb_y_s. Hereinafter referred to as a stationary-state converging velocity Vb_y_stb) becomes a value depending on the base body tilt angle error measured value θbe_y_s about the X-axis direction. More specifically, Vb_x_stb Vb_y_stb becomes Vb_y_stb=(−K1_y·Δθbe_y_s+ωwdot_y_cmd)/K3_y+ Vb_y_mdfd, so that it becomes a function value which changes monotonously with respect to θbe_y_s.

As explained above, when the posture of the sheet 3 and the base body 9 are maintained at a constant posture tilted from the basic posture in the state where Vb_x_mdfd, Vb_y_mdfd are maintained constant, the moving velocity of the vehicle system center-of-gravity point (and further the moving velocity of the wheel assembly 5) converges to the moving velocity having a magnitude and orientation depending on the base body tilt angle error measured values θbe_xy_s.

Further, in a situation wherein, for example, the amount of the tilt of the base body 9 and the sheet 3 from the aforesaid basic posture (the base body tilt angle error measured values θbe_x_s and θbe_y_s) becomes relatively large, and the moving velocity or velocities of the wheel assembly 5 in one or both of the X-axis direction and the Y-axis direction in the case where the amount of tilt is maintained constant (these moving velocities corresponding to the aforesaid expected center-of-gravity velocity stead-state error values Vb_x_prd and Vb_y_prd, respectively, shown in FIG. 12) are an excessively large moving velocity or velocities that would cause the rotational angular velocity or velocities of one or both of the electric motors 31R and 31L to deviate from the permissible range or ranges thereof at the limiting processor 100, then a velocity in the opposite direction from the moving velocity of the wheel assembly 5 (more detailedly, Vw_x_lim2−Vb_x_prd and Vw_y_lim2−Vb_y_prd) will be determined as the desired center-of-gravity velocities for control Vb_x_mdfd and Vb_y_mdfd. Then, the manipulated variable components u3__x and u3__y from within the manipulated variable components constituting a control input are determined such that the estimated center-of-gravity velocity values Vb_x_s and Vb_y_s will be converged to the desired center-of-gravity velocities for control Vb_x_mdfd and Vb_y_mdfd, respectively. Therefore, the velocity increase of the wheel assembly 5 is restrained, thus preventing the rotational angular velocity or velocities of one or both of the electric motors 31R and 31L from becoming excessively high.

Further, in the aforesaid gain adjustor 78, in the situation wherein one or both of the estimated center-of-gravity velocity values Vb_x_s and Vb_y_s become large, and the moving velocity or velocities of the wheel assembly 5 in one or both of the X-axis direction and the Y-axis direction may become an excessively large moving velocity that would cause the rotational angular velocity or velocities of one or both of the electric motors 31R and 31L to deviate from the permissible range or ranges thereof at the limiting processor 86, as the deviation becomes more notable (more specifically, as the absolute values of Vover_x and Vover_y shown in FIG. 10 increase), one or both of the aforesaid gain adjustment parameters Kr_x and Kr_y are brought closer to 1 from 0.

In this case, each i-th gain coefficient Ki_x (i=1, 2 or 3) calculated according to the aforesaid expression 09x approaches to the constant value Ki_b_x on the maximum end from the constant value Ki_a_x on the minimum end, as Kr_x approaches to 1. The same applies to each i-th gain coefficient Ki_y (i=1, 2 or 3) calculated according to the aforesaid expression 09y.

As the absolute values of the aforesaid gain coefficients increase, the sensitivities of the manipulated variables (the imaginary wheel rotational angular acceleration commands ωwdot_x_cmd and ωwdot_y_cmd) in response to a change in the tilt of the base body 9 and the sheet 3 (the change in the base body tilt angle error measured values θbe_xy_s) and in response to the change in the estimated center-of-gravity velocity values Vb_xy_s increase. Hence, when the amount of a tilt of the base body 9 and the sheet 3 from the basic posture indicates an increase, or when the estimated center-of-gravity velocity values Vb_xy_s indicate an increase, the moving velocity of the wheel assembly 5 will be controlled to immediately eliminate these increase. This intensely restrains the base body 9 from considerably tilting from the basic posture and the estimated center-of-gravity velocity values Vb_xy_s from becoming large, thus making it possible to prevent the moving velocity or velocities of the wheel assembly 5 in one or both of the X-axis direction and the Y-axis direction from becoming an excessively high moving velocity that causes the rotational angular velocity or velocities of one or both of the electric motors 31R and 31L to deviate from the permissible range or ranges at the limiting processor 86.

In the present embodiment, a mobility of the vehicle 1 differs between the boarding mode and the autonomous mode. This will be explained later.

In the present embodiment, in the case where the forcible limitation of the output values Vw_x_lim1, Vw_y_lim1 at the limit processor 86 of the gain adjustor 78 are not performed (in the case where the estimated center-of-gravity velocity values Vb_x_s, Vb_y_s are not very high, and where each of the rotational angular velocity of the electric motors 31R, 31L fall within the permissible range), the gain adjustment parameters Kr_x, Kr_y are both determined to 0. That is to say, the gain adjustment parameters Kr_x, Kr_y are usually both determined to 0.

Then, in the case where Kr_x=Kr_y=0, as is apparent from referring to the above-mentioned expressions 09x, 09y, the first gain coefficient K1__x, the second gain coefficient K2__x, and the third gain coefficient K3__x in the above-mentioned expression 07x are each determined to a value coinciding with the values of constant K1__a_x, K2__a_x, and K3__a_x as the constant parameters determined in the above-mentioned STEP 6 or 8. Similarly, the first gain coefficient K1__y, the second gain coefficient K2__y, and the third gain coefficient K3__y in the above-mentioned expression 07y are each determined to a value coinciding with the values of constant K1__a_y, K2__a_y, and K3__a_y as the constant parameters determined in the above-mentioned STEP 6 or 8.

And, in the present embodiment, with respect to the values of coefficient K1__a_x, K3__a_x related to the first gain coefficient K1__x and the third gain constant K3__x of the expression 07x, the values of K1__a_x, K3__a_x for the boarding mode and the values of the K1__a_x, K3__a_x for the autonomous mode are set so that a ratio |K1__a_x|/|K3__a_x| of the absolute value of K1__a_x with respect to the absolute value of K3__a_x in the autonomous mode becomes relatively smaller than a ratio |K1__a_x|/|K3__a_x| of the absolute value of K1__a_x with respect to the absolute value of K3__a_x for the boarding mode.

Similarly, with respect to the values of constant K1__a_y, K3__a_y related to the first gain coefficient K1__y and the third gain coefficient K3__y of the expression 07y, the values of K1__a_y, K3__a_y for the boarding mode and the values of K1__a_y, K3__a_y for the autonomous mode are set so that a ratio |K1__a_y|/|K3__a_y| of the absolute value of K1__a_y with respect to the absolute value of K3__a_y in the autonomous mode becomes relatively smaller than a ratio |K1__a_y|/|K3__a_y| of the absolute value of K1__a_y with respect to the absolute value of K3__a_y in the boarding mode.

Therefore, in an ordinary state in which the estimated center-of-gravity velocity values Vb_x_s, Vb_y_s does not become too high, the ratio |K1__x|/|K3__x| of the absolute value of the first gain coefficient K1__x with respect to the absolute value of the third gain coefficient K3__x of the expression 07x becomes relatively smaller in the case where the operation mode of the vehicle 1 is in the autonomous mode than in the case where the same is in the boarding mode. Similarly, in the ordinary state, the ratio |K1__y|/|K3__y| of the absolute value of the first gain coefficient K1__y with respect to the absolute value of the third gain coefficient K3__y of the expression 07y becomes smaller in the case where the operation mode of the vehicle 1 is in the autonomous mode than in the case where the same is in the boarding mode.

Further, in the present embodiment, with respect to the values of constant K1__a_x, K3__a_x for the boarding mode related to the first gain coefficient K1__x and the third gain coefficient K3__x of the expression 07x, and the values of constant K1__a_y, K3__a_y related to the first gain coefficient K1_y and the third gain coefficient K3__y of the expression 07y, the values of K1__a_x, K3__a_x, K1__a_y and K3__a_y for the boarding mode are set so that the ratio |K1__a_y|/|K3__a_y| of the absolute value of K1__a_y with respect to the absolute value of K3__a_y for the boarding mode related to the Y-axis direction becomes relatively smaller than the ratio |K1__a_x|/|K3__a_x| of the absolute value K1__a_y with respect to the absolute value K3__a_y for the boarding mode in the X-axis direction.

Therefore, in the boarding mode, in the ordinary state where the estimated center-of-gravity velocity values Vb_x_s, Vb_y_s does not become so high, the ratio |K1__y|/|K3__y| of the absolute value of the first gain coefficient K1__y with respect to the absolute value of the third gain coefficient K3__y of the expression 07y becomes relatively smaller than the ratio |K1__x|/|K3__x| of the absolute value of the first gain coefficient K1__x with respect to the absolute value of the third gain coefficient K3__x of the expression 07x.

Supplementally, in addition to setting the values of constant K1_a_x, K3_a_x, K1_a_y, and K3_a_y for the boarding mode so as to become |K1_a_x|/|K3_a_x|>|K1_a_y|/|K3_a_y|, the values of constant K1_b_x, K3_b_x, K1_b_y, and K3_b_y for the boarding mode may be set so as to become K1_a_x/K3_a_x=K1_b_x/K3_b_x, and also K1_a_y/K3_a_y=K1_b_y/K3_b_y, and at the same time |K1_b_x/K3_b_x|>|K1_b_y/K3_b_y|. In such case, in the boarding mode, the gain coefficients K1_x, K3_x, K1_y, and K3_y determined by the above-mentioned expressions 09x, 09y are constantly determined to become |K1_x|/|K3_x|>|K1_y|/|K3_y|.

Further, as is described above, similarly to the case of the boarding mode, also for the values of constant K1_a_x, K3_a_x, K1_a_y, K3_a_y, K1_b_x, K3_b_x, K1_b_y, and K3_b_y for the autonomous mode, the values of these values of constant may be set so as to become |K1_a_x|/|K3_a_x|>|K1_a_y|/|K3_a_y|, or so as to become |K1_x|/|K3_x|>|K1_y|/|K3_y|. However, for the values of constant for the autonomous mode, the value of the values of constant may be set, for example, so that |K1_a_x|/|K3_a_x| and |K1_a_y|/|K3_a_y| becomes the same or almost the same ratio, or so that |K1_x|/|K3_x| and |K1_y|/|K3_y| becomes the same or almost the same ratio.

In the present embodiment, the effects to be described below are available by the fact that, as is explained above, the ratio |K1_x|/|K3_x| and |K1_y|/|K3_y| respectively becomes relatively smaller in the autonomous mode than in the boarding mode, and further, |K1_x|/|K3_x|>|K1_y|/|K3_y| in the boarding mode. In the present explanation, for convenience of understanding, the ordinary case where the moving operation of the wheel assembly 5 is carried out in the moving velocity in which the rotational angular velocities of the electric motors 31R, 31L does not become excessively fast (more accurately, in the case where the forcible restriction of the output values Vw_x_lim2, Vw_y_lim2 of the limit processor 100 of the center-of-gravity velocity restrictor 76 is not performed) is supposed, and the desired center-of-gravity velocities for control Vb_x_mdfd, Vb_y_mdfd are both maintained at 0.

In the case where the posture of the sheet 3 and the base body 9 are maintained at a constant posture tilted from the basic posture in the situation where Vb_x_mdfd, Vb_y_mdfd are maintained at 0, as is explained earlier, the moving velocity of the vehicle system center-of-gravity point (and further the moving velocity of the wheel assembly 5), in the stationary state, converges to the moving velocity having the magnitude and the orientation depending on the base body tilt angle error measured value θbe_xy_s.

In this case, Vb_x_mdfd=Vb_y_mdfd=0, so that the stationary-state converging velocities Vb_x_stb, Vb_y_stb become Vb_x_stb=(−K1_x·Δθbe_x_s+ωwdot_x_cmd)/K3_x, and Vb_y_stb=(−K1_y·Δθbe_y_s+ωwdot_y_cmd)/K3_y. Therefore, the stationary-state converging velocity Vb_x_stb in the X-axis direction depends on the set value of the ratio of the absolute value of the first gain coefficient K1_x with respect to the absolute value of the third gain coefficient K3_x (=|K1_x|/|K3_x|), and Vb_x_stb becomes larger as the set value of the ratio becomes larger. Similarly, the stationary-state converging velocity Vb_y_stb in the Y-axis direction also depends on the set value of the ratio of the absolute value of the first gain coefficient K1_y with respect to the absolute value of the third gain coefficient K3_y (=|K1_y|/|K3_y|), and Vb_y_stb becomes larger as the set value of the ratio becomes larger.

And, in the present embodiment, the gain coefficients K1_x, K3_x, K1_y, and K3_y in each operation mode are determined so that the ratio |K1_x|/|K3_x| and |K1_y|/|K3_y| respectively becomes relatively smaller in the autonomous mode than in the boarding mode, and therefore the set value of |K1_x|/|K3_x| and the set value of |K1_y|/|K3_y| in the autonomous mode becomes a relatively small ratio, and the set value of |K1_x|/|K3_x| and the set value of |K1_y|/|K3_y| in the boarding mode becomes a relatively large ratio.

In the present embodiment, the gain coefficients K1_x, K3_x, K1_y, and K3_y in each operation mode are determined as is explained above, so that, supposing a case where the base body 9 is tilted simultaneously with the sheet 3 from the basic posture for the same angle in each of the boarding mode and the autonomous mode, and the base body tilt angle error measured values θbe_x_s, θbe_y_s are retained at a constant magnitude in both operation modes, the magnitude of each of the stationary-state converging velocities Vb_x_stb, Vb_y_stb in the X-axis direction and Y-axis direction becomes smaller in the autonomous mode than in the boarding mode. Stated otherwise, a ratio of the magnitude of Vb_x_stb with respect to the magnitude of θbe_x_s and a ratio of the magnitude of Vb_y_stb with respect to the magnitude of θbe_y_s becomes smaller in the case of the autonomous mode than in the case of the boarding mode.

That is, because the set value of the ratio |K1_x|/|K3_x| and the set value of the ratio |K1_y|/|K3_y| in the boarding mode are relatively large values, the center-of-gravity velocity Vb_x in the X-axis direction or the center-of-gravity velocity Vb_y in the Y-axis direction becomes larger with good sensitivity with respect to the increase in the magnitude of the base body tilt angle error measured values θbe_x_s, θbe_y_s about the Y-axis or about the X-axis, and converges to a relatively large stationary-state converging velocities Vb_x_stb, Vb_y_stb.

On the other hand, because the set value of the ratio |K1_x|/|K3_x| and the set value of the ratio |K1_y|/|K3_y| in the autonomous mode are relatively small values, the center-of-gravity velocity Vb_x in the X-axis direction or the center-of-gravity velocity Vb_y in the Y-axis direction is difficult to increase with respect to the increase in the magnitude of the base body tilt angle error measured values θbe_x_s, θbe_y_s about the Y-axis or about the X-axis, and converges to a relatively small stationary-state converging velocities Vb_x_stb, Vb_y_stb.

Therefore, in the boarding mode, in the case where the posture of the base body 9 and the sheet 3 are changed from the basic posture, the magnitude of the center-of-gravity velocities Vb_x, Vb_y are easier to increase, but in the autonomous mode, the magnitude of the center-of-gravity velocities Vb_x, Vb_y are difficult to increase.

As such, in the autonomous mode, in the case where either of the estimated center-of-gravity velocity values Vb_x_s, Vb_y_s change from 0, the traveling motion of the wheel assembly 5 to return the same to 0 (movement in the braking direction) is realized with a relatively high sensitivity. As a result, in the autonomous mode, even in the case where the contact surface of the wheel assembly 5 is inclined, it becomes possible to maintain the vehicle 1 stably to a halt state or to a state close thereto, without applying external force to the vehicle 1.

On the other hand, in the boarding mode, in the case where the occupant moves his/her upper body in order to move the vehicle 1, a strong braking power is restrained from acting on the vehicle 1. Eventually, the vehicle 1 is easier to start moving than in the case of the autonomous mode, so that maneuverability of the vehicle 1 is enhanced further.

Further, in the present embodiment, the gain coefficients K1_x, K3_x, K1_y, and K3_y are determined so as to become |K1_x|/|K3_x|>|K1_y|/|K3_y| in the boarding mode, so that the set value of |K1_x|/|K3_x| in the boarding mode becomes a relatively large ratio, and the set value of |K1_y|/|K3_y| becomes a relatively small ratio.

As such, for example in the boarding mode, supposing a case where the base body 9 is tilted simultaneously with the sheet 3 from the basic posture about the two axes of the X-axis and the Y-axis, and the base body tilt angle error measured values θbe_x_s, θbe_y_s are retained as a constant magnitude (≠0), the magnitude of the stationary-state converging velocity Vb_x_stb in the X-axis direction becomes larger than the magnitude of the stationary-state converging velocity Vb_y_stb in the Y-axis direction. Stated otherwise, a ratio of the magnitude of Vb_x_stb with respect to the magnitude of θbe_x_s becomes larger than a ratio of the magnitude of Vb_y_stb with respect to the magnitude of θbe_y_s.

That is, because the set value of the ratio |K1__$x$|/|K3__$x$| is a relatively large value, the center-of-gravity velocity Vb_x in the X-axis direction becomes larger with good sensitivity with respect to the increase in the magnitude of the base body tilt angle error measured value θbe_x_s about the Y-axis, and converges to a relatively large stationary-state converging velocity Vb_x_stb. On the other hand, because |K1__$y$|/|K3__$y$| is a relatively small value, the magnitude of the center-of-gravity velocity Vb_y in the Y-axis direction is difficult to increase with respect to the increase in the magnitude of the base body tilt angle error measured value θbe_y_s about the X-axis, and converges to a relatively small stationary-state converging velocity Vb_y_stb.

Therefore, when |θbe_x_s|=|θbe_y_s|, |Vb_x_stb|>|Vb_y_stb| holds. And consequently, |Vb_x_stb|/|θbe_x_s|>|Vb_y_stb|/|θbe_y_s| holds.

Therefore, in the boarding mode, in the case where the posture of the base body 9 and the sheet 3 are changed from the basic posture, the magnitude of the center-of-gravity velocity Vb_x in the X-axis direction is easier to increase with respect to the change in the posture of the base body 9 and the sheet 3 about the Y-axis, but the magnitude of the center-of-gravity velocity Vb_y in the Y-axis direction is difficult to increase with respect to the change in the posture of the base body 9 and the sheet 3 about the X-axis.

Therefore, in the boarding mode, in the case where the vehicle 1 is made to move in the X-axis direction, the magnitude of the center-of-gravity velocity Vb_y in the Y-axis direction is maintained at 0 or to a velocity in the vicinity thereof, even when the base body tilt angle error measured value θbe_x_s about the X-axis generates some deviation from 0 (generates some variation with respect to 0). Eventually, the variation (dispersion) of the moving direction of the wheel assembly 5 with respect to the X-axis direction may be made small.

Therefore, in the case where the wheel assembly 5 is made to move in the X-axis direction (the fore-and-aft direction of the occupant), by tilting the base body 9 and the sheet 3 forward or backward while the base body tilt angle error measured value θbe_x_s about the X-axis is made to schematically fall within a value in the vicinity of 0, it becomes possible to move the vehicle 1 so that the actual moving direction of the wheel assembly 5 approximately coincides with the X-axis direction. That is, it becomes possible to move the vehicle 1 in the fore-and-aft direction of the occupant, while suppressing the occurrence of variation in the actual moving direction of the wheel assembly 5 with respect to the X-axis direction. Eventually, the maneuvering operation for moving the vehicle 1 in the fore-and-aft direction may be performed easily.

Here, the correspondence relationship between the vehicle 1 of the present embodiment and the present invention will be supplementally described.

In the present embodiment, the sheet 3 (payload supporting part) corresponds to the loading part (the loading part of the occupant as the object to be transported) of the present invention. Further, the fore-and-aft direction (the X-axis direction) and the lateral direction (the Y-axis direction) of the occupant aboard the vehicle 1 correspond to the first direction and the second direction, respectively, in the present invention.

Further, the boarding mode and the autonomous mode respectively corresponds to the loaded state mode and the non-loaded state mode of the present invention.

Further, the tilt angle measuring element of the present invention is realized by the tilt sensor 52 and the processing of STEP 2 in FIG. 7. In this case, the base body tilt angle measured values θb_xy_s correspond to the measured value of the tilt angle of the sheet 3 as the loading part. Further, the base body tilt angle errors θbe_xy correspond to the tilt error in the present invention.

Further, the representative point velocity measuring element of the present invention is realized by the center-of-gravity velocity calculator 72. In this case, in the present embodiment, the vehicle system center-of-gravity point (the vehicle-occupant overall center-of-gravity point in the boarding mode, and the vehicle-alone center-of-gravity point in the autonomous mode) corresponds to the predetermined representative point of the vehicle, and an estimated center-of-gravity velocity value Vb_xy_s (a velocity vector comprising Vb_x_s and Vb_y_s) corresponds to the measured value of the representative point velocity in the present invention.

Further, the traveling motion unit controlling element of the present invention is realized by the control unit 10, and the above-mentioned STEPS 4 through 10 carried out by the control unit 10 correspond to the control processing of the present invention. The first manipulated variable for control determination process and the second manipulated variable for control determination process of the present invention is respectively realized by the arithmetic process of the above-mentioned expressions 07x, 07y carried out by the posture control calculator 80 in STEP 9.

Further, the stationary-state converging velocities Vb_xy_stb correspond to the stationary-state converging velocity of the present invention, and |Vb_x_stb|/|θbe_x_s|, |Vb_y_stb|/|θbe_y_s| correspond to the first tilt error-velocity ratio and the second tilt error-velocity ratio of the present invention, respectively.

Further, the imaginary wheel rotational angular acceleration commands ωwdot_x_cmd and ωwdot_y_cmd correspond to the first manipulated variable for control and the second manipulated variable for control of the present invention, respectively. From within the manipulated variable component ui_x (i=1, 2, 3) constituting ωwdot_x_cmd, u1_x and u3_x correspond to the first A manipulated variable component and the first B manipulated variable component of the present invention, respectively, and from within the gain coefficient Ki_x (i=1, 2, 3), K1_x and K3_x correspond to the first A gain coefficient and the first B gain coefficient of the present invention, respectively.

Similarly, from within the manipulated variable component ui_y (i=1, 2, 3) constituting ωdotw_y_cmd, u1_y and u3_y correspond to the second A manipulated variable component and the second B manipulated variable component of the present invention, respectively, and from within the gain coefficient Ki_y (i=1, 2, 3), K1_y and K3_y correspond to the second A gain coefficient and the second B gain coefficient of the present invention, respectively.

Further, |K1__$x$|/|K3__$x$|, |K1__$y$|/|K3__$y$| correspond to the above-mentioned first gain ratio and the second gain ratio, respectively.

Some modifications related to the embodiments described above will now be described.

In each of the aforesaid embodiments, the vehicle system center-of-gravity point has been the predetermined representative point of the vehicle. Alternatively, however, the representative point may be set at, for example, the central point of the wheel assembly 5 or a point of a predetermined part (e.g., the support frame 13) of the base body 9, and the moving velocity of the representative point may be used in place of the center-of-gravity point velocity.

Further, in the aforesaid embodiments, the boarding mode as the loaded state mode and the autonomous mode as the non-loaded state mode had been switched in accordance with the output of the load sensor 54 (a load measurement value). However, a manipulation switch for switching of the operation mode may be provided on the vehicle 1, and the switching of the operation mode may be performed by the manipulation of the manipulation switch by the occupant.

Further, in the aforesaid embodiments, it is set in the boarding mode so that $|K1\_x|/|K3\_x|>|K1\_y|/|K3\_y|$ holds. However, for example $|K1\_x|/|K3\_x|$ and $|K1\_y|/|K3\_y|$ may be set so as to be a ratio equal to or approximately equal to each other.

Further, in the aforesaid embodiments, the ratio $|K1\_x|/|K3\_x|$ and $|K1\_y|/|K3\_y|$ are respectively smaller in the autonomous mode than in the boarding mode. However, it may be set so that either one of the ratios becomes smaller in the autonomous mode than in the boarding mode, and the other ratio is equal to or approximately equal to each other in the autonomous mode and the boarding mode. For example, in the vehicle 1 of the present embodiment, the X-axis direction (the fore-and-aft direction of the occupant) generally becomes the standard traveling direction (the traveling direction with high frequency) of the vehicle 1, so that it is preferable that the ratio $|K1\_x|/|K3\_x|$ with respect to the X-axis direction becomes smaller in the autonomous mode than in the boarding mode. Further, for the ratio $|K1\_y|/|K3\_y|$ with respect to the Y-axis direction, the ratio $|K1\_y|/|K3\_y|$ may be set to be equal to or approximately equal to each other in the autonomous mode and the boarding mode, at a relatively small value (for example, a value in a similar range to the ratio $|K1\_x|/|K3\_x|$ with respect to the X-axis direction in the autonomous mode).

Further, in each of the aforesaid embodiments, the vehicle 1 having the structure illustrated in FIG. 1 and FIG. 2 has been exemplified. However, the inverted pendulum type vehicle 1 in the present invention is not limited to the vehicle 1 exemplified in embodiments.

To be more specific, the wheel assembly 5 serving as the traveling motion unit of the vehicle 1 in the embodiments has the one-piece construction. Alternatively, however, the wheel assembly 5 may have a construction shown in, for example, FIG. 10 of the aforesaid patent document 3. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

Further, the traveling motion unit may have a crawler-shaped structure, as shown in, for example, FIG. 3 of patent document 2.

Figure 5:
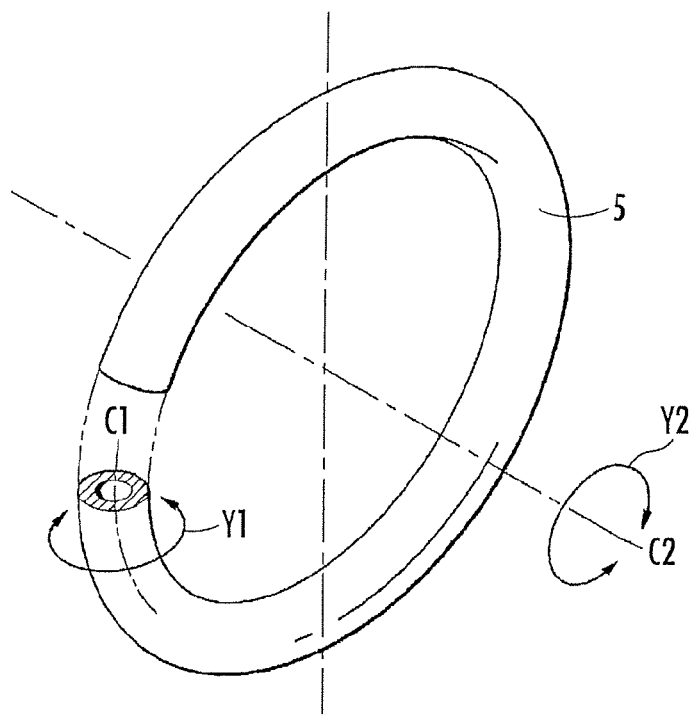
FIG. 5 is a perspective view of a traveling motion unit (wheel unit) of the inverted pendulum type vehicle according to the embodiment.

Alternatively, as shown in, for example, FIG. 5 of the aforesaid patent document 2, FIG. 7 of patent document 3, or FIG. 1 of patent document 1, the traveling motion unit may be constructed of a spherical member, and the vehicle may be constructed such that the spherical member is rotatively driven in a direction about the X-axis and a direction about the Y-axis by an actuator (e.g., an actuator having the aforesaid wheel assembly 5).

Further, in the embodiments, the vehicle 1 provided with the seat 3 as the boarding section for an occupant has been exemplified. Alternatively, however, the inverted pendulum type vehicle in accordance with the present invention may be a vehicle having a construction wherein a step on which an occupant rests his/her both feet and a section to be gripped by the occupant standing on the step are mounted on a base body, as illustrated in, for example, FIG. 8 in patent document 3.

Thus, the present invention can be applied to inverted pendulum type vehicles of various constructions, as illustrated in the aforesaid patent documents 1 to 3 and the like.

Further, the inverted pendulum type vehicle in accordance with the present invention may be provided with a plurality of traveling motion units (e.g., two in the lateral direction, or two in the fore-and-aft direction, or three or more) capable of moving in all directions on the floor.

Further, the inverted pendulum type vehicle of the present invention may be an inverted pendulum type vehicle in which an loading part is tiltable about one axis only (for example, about the axis in the lateral direction of the occupant boarding the vehicle), and the vehicle moves in the fore-and-aft direction of the occupant in accordance with the tilting movement thereof.

Further, in the inverted pendulum type vehicle of the aforesaid embodiment, the vehicle is equipped with the payload supporting part (sheet) 3 of the occupant as the loading part. However, the vehicle may be equipped with a loading part for loading the object to be transported such as a baggage, in place of the payload supporting part 3 of the occupant. In this case, a control processing similar to that in the boarding mode is performed in the state where the object to be transported is loaded to the loading part, and a control processing similar to that in the autonomous mode is performed in the state where the object to be transported is not loaded on the loading part.

DESCRIPTION OF REFERENCE NUMERALS

1 . . . inverted pendulum type vehicle; 3 . . . seat (loading part); 5 . . . wheel assembly (traveling motion unit); 7 . . . actuator; 9 . . . base body; 50 . . . control unit (traveling motion unit controlling element); 52 . . . tilt sensor (tilt angle measuring element); 72 . . . center-of-gravity calculator (representative point velocity measuring element); STEP2 . . . tilt angle measuring element; and STEP4 through STEP10 . . . control processing

The invention claimed is:

1. A control device of an inverted pendulum type vehicle having a traveling motion unit capable of moving on a floor surface at least in a first direction, an actuator which drives the traveling motion unit, a base body on which the traveling motion unit and the actuator are mounted, and a loading part of an object to be transported mounted to the base body so as to be tiltable at least with respect to a vertical direction about an axis in a second direction which is orthogonal to the first direction, comprising:

a traveling motion unit controlling element which includes a loaded state mode and a non-loaded state mode that are operation modes of the vehicle for controlling the traveling motion unit, the loaded state mode being the operation mode in which the object to be transported is loaded on the loading part, and the non-loaded state mode being the operation mode in which the object to be transported is not loaded on the loading part, and the traveling motion unit controlling element controls the traveling motion of the traveling motion unit via the actuator, in each operation mode of the loaded state mode and the non-loaded state mode;

wherein the traveling motion unit controlling element controls the traveling motion unit, by executing a control processing which is configured to make an actual traveling velocity of a predetermined representative point of the vehicle converge to a steady-state converging velocity which depends on a tilt error, the tilt error being an error between an actual tilt angle of the loading part and a desired tilt angle of a predetermined value for each operation mode, at least in a steady state in which the tilt error is maintained constant, and at the same time to make the steady-state converging velocity in the first direction change monotonously in accordance with the tilt error about an axis in the second direction, and also to make a ratio of a magnitude of the steady-state converging velocity in the first direction with respect to a magnitude of the tilt error about the axis in the second direction relatively smaller in the non-loaded state mode than in the loaded state mode.

2. The control device of the inverted pendulum type vehicle according to claim 1, wherein
the traveling motion unit is configured to be movable in all directions including the first direction and the second direction,
the loading part is mounted to the base body so as to be tiltable about two axes, about the axis in the first direction and about the axis in the second direction, and
the control processing executed by the traveling motion unit controlling element is configured to make the steady-state converging velocity in the second direction change monotonously in accordance with the tilt error about the axis in the first direction, in addition to making the steady-state converging velocity in the first direction change monotonously in accordance with the tilt error about the axis in the second direction.

3. The control device of the inverted pendulum type vehicle according to claim 2, wherein
the control processing executed by the traveling motion unit controlling element is configured to make the ratio of the magnitude of the steady-state converging velocity in the first direction with respect to the magnitude of the tilt error about the axis in the second direction and the ratio of the magnitude of the steady-state converging velocity in the second direction with respect to the magnitude of the tilt error about the axis in the first direction, respectively, become relatively smaller in the non-loaded state mode than in the loaded state mode.

4. The control device of the inverted pendulum type vehicle according to claim 3, further comprising
a tilt angle measuring element which generates an output in accordance with the actual tilt angle of the loading part, and
a representative point velocity measuring element which generates an output in accordance with the actual traveling velocity of the representative point,
wherein the traveling motion unit controlling element is an element which sequentially determines, with the control processing, in each operation mode, manipulated variables for control comprising a first manipulated variable for control which defines a driving power to be applied to the traveling motion unit in order to make the traveling motion unit travel in the first direction and a second manipulated variable for control which defines a driving power to be applied to the traveling motion unit in order to make the traveling motion unit travel in the second direction, and which controls the traveling motion of the traveling motion unit in accordance with the determined manipulated variables for control via the actuator,
the control processing includes,
a first manipulated variable for control determination process which determines the first manipulated variable for control such that the tilt error about the axis in the second direction and the traveling velocity of the representative point in the first direction are brought closer to 0, at least by combining a first A manipulated variable component, which is obtained by multiplying a first A gain coefficient for each operation mode by the tilt error about the axis in the second direction calculated from a measured value of the tilt angle of the loading part represented by the output of the tilt angle measuring element and the desired tilt angle thereof, and a first B manipulated variable component, which is obtained by multiplying a first B gain coefficient for each operation mode by a measured value of the traveling velocity of the representative point in the first direction represented by the output of the representative point velocity measuring element, and
a second manipulated variable for control determination process which determines the second manipulated variable for control such that the tilt error about the axis in the first direction and the traveling velocity of the representative point in the second direction are brought closer to 0, at least by combining a second A manipulated variable component, which is obtained by multiplying a second A gain coefficient for each operation mode by the tilt error about the axis in the first direction calculated from a measured value of the tilt angle of the loading part represented by the output of the tilt angle measuring element and the desired tilt angle thereof, and a second B manipulated variable component, which is obtained by multiplying a second B gain coefficient for each operation mode by a measured value of the traveling velocity of the representative point in the second direction represented by the output of the representative point velocity measuring element,
values of the first A gain coefficient and the first B gain coefficient for each operation mode used in the first manipulated variable for control determination process are set so that a ratio of an absolute value of the first A gain coefficient with respect to an absolute value of the first B gain coefficient for the non-loaded state mode becomes relatively smaller than a ratio of an absolute value of the first A gain coefficient with respect to an absolute value of the first B gain coefficient for the loaded state mode, so as to make the ratio of the magnitude of the steady-state converging velocity in the first direction with respect to the magnitude of the tilt error about the axis in the second direction become relatively smaller in the non-loaded state mode than in the loaded state mode, and
values of the second A gain coefficient and the second B coefficient for each operation mode used in the second manipulated variable for control determination process are set so that a ratio of an absolute value of the second A gain coefficient with respect to an absolute value of the second B gain coefficient for the non-loaded state mode becomes relatively smaller than a ratio of an absolute value of the second A gain coefficient with respect to an absolute value of the second B gain coefficient for the loaded state mode, so as to make the ratio of the magnitude of the steady-state converging velocity in the second direction with respect to the magnitude of the tilt error about the axis in the first direction become relatively smaller in the non-loaded state mode than in the loaded state mode.

5. The control device of the inverted pendulum type vehicle according to claim 2, wherein
the loading part is configured so that an occupant as the object to be transported is capable of boarding with a fore-and-aft direction and a lateral direction of the occupant coinciding with the first direction and the second direction, respectively, and
the control processing executed by the traveling motion unit controlling element is configured to make the ratio of the magnitude of the steady-state converging velocity in the second direction with respect to the magnitude of the tilt error about the axis in the first direction become relatively smaller than the ratio of the magnitude of the steady-state converging velocity in the first direction with respect to the tilt error about the axis in the second direction, at least in the loaded state mode among the loaded state mode and the non-loaded state mode.

6. The control device of the inverted pendulum type vehicle according to claim 5, further comprising
a tilt angle measuring element which generates an output in accordance with the actual tilt angle of the loading part, and
a representative point velocity measuring element which generates an output in accordance with the actual traveling velocity of the representative point,
wherein the traveling motion unit controlling element is an element which sequentially determines, with the control processing, in each operation mode, manipulated variables for control comprising a first manipulated variable for control which defines a driving power to be applied to the traveling motion unit in order to make the traveling motion unit travel in the first direction and a second manipulated variable for control which defines a driving power to be applied to the traveling motion unit in order to make the traveling motion unit travel in the second direction, and which controls the traveling motion of the traveling motion unit in accordance with the determined manipulated variables for control via the actuator,
the control processing includes
a first manipulated variable for control determination process which determines the first manipulated variable for control such that the tilt error about the axis in the second direction and the traveling velocity of the representative point in the first direction are brought closer to 0, at least by combining a first A manipulated variable component, which is obtained by multiplying a first A gain coefficient for each operation mode by the tilt error about the axis in the second direction calculated from a measured value of the tilt angle of the loading part represented by the output of the tilt angle measuring element and the desired tilt angle thereof, and a first B manipulated variable component, which is obtained by multiplying a first B gain coefficient for each operation mode with a measured value of the traveling velocity of the representative point in the first direction represented by the output of the representative point velocity measuring element, and
a second manipulated variable for control determination process which determines the second manipulated variable for control such that the tilt error about the axis in the first direction and the traveling velocity of the representative point in the second direction are brought closer to 0, at least by combining a second A manipulated variable component, which is obtained by multiplying a second A gain coefficient for each operation mode by the tilt error about the axis in the first direction calculated from a measured value of the tilt angle of the loading part represented by the output of the tilt angle measuring element and the desired tilt angle thereof, and a second B manipulated variable component, which is obtained by multiplying a second B gain coefficient for each operation mode by a measured value of the traveling velocity of the representative point in the second direction represented by the output of the representative point velocity measuring element, and
values of the first A gain coefficient, the first B gain coefficient, the second A gain coefficient and the second B gain coefficient for the loaded state mode used in the first manipulated variable for control determination process are set so that a ratio of an absolute value of the second A gain coefficient with respect to an absolute value of the second B gain coefficient for the loaded state mode becomes relatively smaller than a ratio of an absolute value of the first A gain coefficient with respect to an absolute value of the first B gain coefficient for the loaded state mode, so as to make the ratio of the magnitude of the steady-state converging velocity in the second direction with respect to the magnitude of the tilt error about the axis in the first direction relatively smaller than the ratio of the magnitude of the steady-state converging velocity in the first direction with respect to the magnitude of the tilt error about the axis in the second direction in the loaded state mode.

7. The control device of the inverted pendulum type vehicle according to claim 1, further comprising
a tilt angle measuring element which generates an output in accordance with the actual tilt angle of the loading part, and
a representative point velocity measuring element which generates an output in accordance with the actual traveling velocity of the representative point,
wherein the traveling motion unit controlling element is an element which sequentially determines, with the control processing, in each operation mode, manipulated variables for control at least including a first manipulated variable for control which defines a driving power to be applied to the traveling motion unit in order to make the traveling motion unit travel in the first direction, and which controls the traveling motion of the traveling motion unit in accordance with the determined manipulated variables for control via the actuator,
the control processing includes a first manipulated variable for control determination process which determines the first manipulated variable for control such that the tilt error about the axis in the second direction and the traveling velocity of the representative point in the first direction are brought closer to 0, at least by combining a first A manipulated variable component, which is obtained by multiplying a first A gain coefficient for each operation mode by the tilt error about the axis in the second direction calculated from a measured value of the tilt angle of the loading part represented by the output of the tilt angle measuring element and the desired tilt angle thereof, and a first B manipulated variable component, which is obtained by multiplying a first B gain coefficient for each operation mode by a measured value of the traveling velocity of the representative point in the first direction represented by the output of the representative point velocity measuring element, and
values of the first A gain coefficient and the first B gain coefficient for each operation mode used in the first manipulated variable for control determination process are set so that a ratio of an absolute value of the first A gain coefficient with respect to an absolute value of the first B gain coefficient for the non-loaded state mode becomes relatively smaller than a ratio of an absolute value of the first A gain coefficient with respect to an absolute value of the first B gain coefficient for the loaded state mode, so as to make the ratio of the magnitude of the steady-state converging velocity in the first direction with respect to the magnitude of the tilt error about the axis in the second direction become relatively smaller in the non-loaded state mode than in the loaded state mode.

* * * * *